United States Patent
Malladi et al.

(10) Patent No.: US 10,721,693 B2
(45) Date of Patent: Jul. 21, 2020

(54) MOBILITY AND POWER CONTROL TECHNIQUES ACROSS MULTIPLE RADIO ACCESS TECHNOLOGIES

(71) Applicant: QUALCOMM Incorporated, San Diego, CA (US)

(72) Inventors: Durga Prasad Malladi, San Diego, CA (US); Tingfang Ji, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/129,654

(22) Filed: Sep. 12, 2018

(65) Prior Publication Data

US 2019/0082395 A1     Mar. 14, 2019

Related U.S. Application Data

(60) Provisional application No. 62/558,764, filed on Sep. 14, 2017.

(51) Int. Cl.
*H04W 52/24*     (2009.01)
*H04W 76/27*     (2018.01)
(Continued)

(52) U.S. Cl.
CPC ..... *H04W 52/245* (2013.01); *H04W 36/0069* (2018.08); *H04W 36/30* (2013.01);
(Continued)

(58) Field of Classification Search
CPC .... H04B 7/00; H04L 5/0073; H04W 36/0061; H04W 36/0069; H04W 36/0083;
(Continued)

(56) References Cited

U.S. PATENT DOCUMENTS

| | | | | |
|---|---|---|---|---|
| 2012/0106477 A1* | 5/2012 | Kwon | ................ | H04W 52/365 370/329 |
| 2013/0225149 A1* | 8/2013 | Sadek | .................. | H04W 16/14 455/418 |

(Continued)

FOREIGN PATENT DOCUMENTS

WO    WO-2014152885 A1    9/2014

OTHER PUBLICATIONS

China Telecom: "Discussion on Remaining Issues of NR-LTE Co-existence", 3GPP Draft; R1-1716454, 3rd Generation Partnership Project (3GPP), Mobile Competence Centre ; 650, Route Des Lucioles ; F-06921 Sophia-antipolis Cedex ; France vol. RAN WG1. No. Nagoya. Japan; Sep. 18, 2017-Sep. 21, 2017 Sep. 12, 2017, XP051330041, Retrieved from the Internet: URL:http://www.3gpp.org/ftp/tsg_ran/WG1_RL1/TSGR1_AH/NR_AH_1709/Docs/ [retrieved on—Sep. 12, 2017], 6 pages.

(Continued)

*Primary Examiner* — Yuwen Pan
*Assistant Examiner* — Paul P Tran
(74) *Attorney, Agent, or Firm* — Holland & Hart LLP

(57) ABSTRACT

Methods, systems, and devices for wireless communications are described, in which for one or more aspects of a first transmission of a first radio access technology (RAT) (e.g., a 5G or New Radio (NR) RAT) are determined based on transmissions of a second RAT (e.g., a 4G or Long Term Evolution (LTE) RAT). A user equipment (UE) may, in some cases, determine a reference timing, a reference power, or combinations thereof for an uplink transmission of the first RAT based on a received power or reference timing of the second RAT. In some cases, handover for the first RAT may be based at least in part on an handover in the second RAT.

30 Claims, 13 Drawing Sheets

(51) Int. Cl.
- *H04W 36/30* (2009.01)
- *H04W 52/38* (2009.01)
- *H04W 36/00* (2009.01)
- *H04W 52/14* (2009.01)
- *H04W 72/04* (2009.01)
- *H04W 56/00* (2009.01)
- *H04W 36/08* (2009.01)
- *H04W 74/08* (2009.01)

(52) U.S. Cl.
CPC ......... *H04W 52/242* (2013.01); *H04W 52/38* (2013.01); *H04W 72/0473* (2013.01); *H04W 76/27* (2018.02); *H04W 36/08* (2013.01); *H04W 52/146* (2013.01); *H04W 56/001* (2013.01); *H04W 72/0453* (2013.01); *H04W 74/0833* (2013.01)

(58) Field of Classification Search
CPC ... H04W 36/08; H04W 36/245; H04W 36/30; H04W 52/146; H04W 52/242; H04W 52/244; H04W 52/245; H04W 52/325; H04W 52/365; H04W 52/367; H04W 52/38; H04W 52/40; H04W 52/54; H04W 56/001; H04W 72/0413; H04W 72/042; H04W 72/0453; H04W 72/046; H04W 72/0473; H04W 74/0833; H04W 76/27
See application file for complete search history.

(56) References Cited

U.S. PATENT DOCUMENTS

| | | | | |
|---|---|---|---|---|
| 2014/0348078 A1* | 11/2014 | Kim | .................... | H04W 52/146 370/329 |
| 2016/0128004 A1* | 5/2016 | Lee | .................... | H04W 52/146 370/311 |
| 2016/0143039 A1* | 5/2016 | Baldemair | ........ | H04W 72/1252 370/329 |
| 2016/0262074 A1* | 9/2016 | Reial | ................. | H04W 36/0083 |
| 2017/0118776 A1 | 4/2017 | Yasukawa et al. | | |
| 2017/0171858 A1* | 6/2017 | Wang | .................. | H04W 52/325 |
| 2018/0139701 A1* | 5/2018 | Wang | ................ | H04W 72/0473 |
| 2018/0279227 A1* | 9/2018 | Kim | ...................... | H04W 52/14 |

OTHER PUBLICATIONS

Ericsson: "On NR-LTE Co-existence", 3GPP Draft; R1-1714461, 3rd Generation Partnership Project (3GPP), Mobile Competence Centre ; 650, Route Des Lucioles ; F-06921 Sophia-antipolis Cedex ; France vol. RAN WG1, No. Prague, Czech Republic; Aug. 21, 2017-Aug. 25, 2017 Aug. 20, 2017, XP051317239, Retrieved from the Internet: URL:http://www.3gpp.org/ftp/Meetings_3GPP_SYNC/RAN1/Docs/ [retrieved on Aug. 20, 2017], 6 pages.

Huawei et al., "Discussion on the UL Power Control for LTE-NR Uplink Coexistence", 3GPP Draft; R1-1715479, 3rd Generation Partnership Project (3GPP), Mobile Competence Centre ; 650, Route Des Lucioles ; F-06921 Sophia-antipolis Cedex ; France vol. RAN WG1, No. Nagoya, Japan; Sep. 18, 2017-Sep. 21, 2017, Sep. 11, 2017, XP051329035, Retrieved from the Internet: URL:http://www.3gpp.org/ftp/tsg_ran/WG1_RL1/TSGR1_AH/NR_AH_1709/Docs/ [retrieved on—Sep. 11, 2017], 5 pages.

MCC Support: "Draft Report of 3GPP TSG RAN WG1 #90 V0.1.0", 3GPP Draft; DRAFT_MINUTES_REPORT_RAN1#90 V010, 3rd Generation Partnership Project (3GPP), Mobile Competence Centre ; 650, Route Des Lucioles ; F-06921 Sophia-antipolis Cedex ; France vol. RAN WG1, No. Prague, Czech Rep; Oct. 9, 2017-Oct. 13, 2017 Aug. 30, 2017, XP051328889, Retrieved from the Internet: URL:http://www.3gpp.org/ftp/tsg_ran/WG1_RL1/TSGR1_90/Report/ [retrieved on Aug. 30, 2017], 167 pages.

Partial International Search Report—PCT/US2018/050907—ISA/EPO—dated Nov. 15, 2018.

International Search Report and Written Opinion—PCT/US2018/050907—ISA/EPO—dated Jan. 14, 2019.

* cited by examiner

→ RAT-1 Transmission

--→ RAT-2 Transmission

→ RAT-1 High-Band Transmission

┄┄▶ RAT-1 Low-Band Transmission

╌╌▶ RAT-2 Anchor Carrier

MOBILITY AND POWER CONTROL TECHNIQUES ACROSS MULTIPLE RADIO ACCESS TECHNOLOGIES

CROSS REFERENCES

The present Application for Patent claims benefit of U.S. Provisional Patent Application No. 62/558,764 by Malladi et al., entitled "MOBILITY AND POWER CONTROL TECHNIQUES ACROSS MULTIPLE RADIO ACCESS TECHNOLOGIES," filed Sep. 14, 2017, assigned to the assignee hereof, and expressly incorporated by reference in its entirety.

BACKGROUND

The following relates generally to wireless communication, and more specifically to mobility and power control techniques across multiple radio access technologies.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time-division multiple access (TDMA), frequency division multiple access (FDMA), orthogonal frequency-division multiple access (OFDMA), or discrete Fourier transform-spread-orthogonal frequency-division multiplexing (OFDM) (DFT-S-OFDM). A wireless multiple-access communications system may include a number of base stations or network access nodes, each simultaneously supporting communication for multiple communication devices, which may be otherwise known as user equipments (UEs).

SUMMARY

The described techniques relate to improved methods, systems, devices, or apparatuses that support mobility, timing, and power control techniques across multiple radio access technologies. Generally, the described techniques provide for one or more aspects of a first transmission of a first radio access technology (RAT) (e.g., a 5G or new radio (NR) RAT), to be determined based on received transmissions of a second RAT (e.g., a 4G or Long Term Evolution (LTE) RAT). In some cases, a user equipment (UE) may identify a received power of a downlink transmission of the second RAT, and determine an uplink transmission power for the first uplink transmission of the first RAT based at least in part on the received power of the second RAT. Additionally or alternatively, a reference timing of the second RAT may be used to determine an uplink timing for the first uplink transmission. In some cases, the UE may establish a first connection with a first base station using a first RAT and establish a second connection with the first base station using the second RAT, and initiate a handover of the first connection based on determining that the second connection is to be handed over to a second base station.

A method of wireless communication is described. The method may include identifying a first uplink transmission that is to be transmitted using a first RAT, identifying a received power of a downlink transmission of a second RAT that is different than the first RAT, determining a first uplink transmission power for the first uplink transmission of the first RAT based at least in part on the received power of the downlink transmission of the second RAT, and transmitting the first uplink transmission using the first uplink transmission power.

An apparatus for wireless communication is described. The apparatus may include means for identifying a first uplink transmission that is to be transmitted using a first RAT, means for identifying a received power of a downlink transmission of a second RAT that is different than the first RAT, means for determining a first uplink transmission power for the first uplink transmission of the first RAT based at least in part on the received power of the downlink transmission of the second RAT, and means for transmitting the first uplink transmission using the first uplink transmission power.

Another apparatus for wireless communication is described. The apparatus may include a processor, memory in electronic communication with the processor, and instructions stored in the memory. The instructions may be operable to cause the processor to identify a first uplink transmission that is to be transmitted using a first RAT, identify a received power of a downlink transmission of a second RAT that is different than the first RAT, determine a first uplink transmission power for the first uplink transmission of the first RAT based at least in part on the received power of the downlink transmission of the second RAT, and transmit the first uplink transmission using the first uplink transmission power.

A non-transitory computer readable medium for wireless communication is described. The non-transitory computer-readable medium may include instructions operable to cause a processor to identify a first uplink transmission that is to be transmitted using a first RAT, identify a received power of a downlink transmission of a second RAT that is different than the first RAT, determine a first uplink transmission power for the first uplink transmission of the first RAT based at least in part on the received power of the downlink transmission of the second RAT, and transmit the first uplink transmission using the first uplink transmission power.

In some examples of the method, apparatus, and non-transitory computer-readable medium described above, the identifying the received power of the downlink transmission of the second RAT further comprises identifying the downlink transmission of the second RAT, measuring the received power of the downlink transmission of the second RAT, and determining a pathloss associated with the downlink transmission of the second RAT based at least in part on the measured received power. In some examples of the method, apparatus, and non-transitory computer-readable medium described above, the determining the first uplink transmission power for the first uplink transmission of the first RAT further comprises using the pathloss associated with the downlink transmission of the second RAT as a reference serving cell pathloss in an uplink power calculation for the first uplink transmission of the first RAT. In some examples of the method, apparatus, and non-transitory computer-readable medium described above, a transmitter of the downlink transmission of the second RAT may be colocated with a receiver of the first uplink transmission.

In some examples of the method, apparatus, and non-transitory computer-readable medium described above, the first uplink transmission may be a supplemental uplink transmission of the first RAT, and wherein the method further comprises receiving a downlink transmission of the first RAT transmitted using a frequency that may be in a different frequency band than a frequency of the supplemental uplink transmission. In some examples of the method, apparatus, and non-transitory computer-readable medium described above, the downlink transmission of the first RAT may not be used to determine the first uplink transmission power for the supplemental uplink transmission. In some examples of the method, apparatus, and non-transitory computer-readable medium described above, the downlink transmission of the second RAT may be transmitted using a frequency that may be within a same frequency band as the frequency of the supplemental uplink transmission.

In some examples of the method, apparatus, and non-transitory computer-readable medium described above, the first uplink transmission may be a random access channel (RACH) transmission and the received power of the downlink transmission of the second RAT may be used for open loop power control and ramping of a random access procedure.

Some examples of the method, apparatus, and non-transitory computer-readable medium described above may further include processes, features, means, or instructions for receiving configuration information liking the downlink transmission of the second RAT to the first uplink transmission of the first RAT. In some examples of the method, apparatus, and non-transitory computer-readable medium described above, the configuration information may be received in radio resource control (RRC) signaling from a base station of the first RAT. In some examples of the method, apparatus, and non-transitory computer-readable medium described above, the first RAT may be a NR or 5G RAT, and the second RAT may be a LTE or 4G RAT.

A method of wireless communication is described. The method may include identifying a first uplink transmission that is to be transmitted using a first RAT, identifying a reference timing of a second RAT that is different than the first RAT, determining an uplink timing for the first uplink transmission of the first RAT based at least in part on the reference timing of the second RAT, and transmitting the first uplink transmission using the uplink timing.

An apparatus for wireless communication is described. The apparatus may include means for identifying a first uplink transmission that is to be transmitted using a first RAT, means for identifying a reference timing of a second RAT that is different than the first RAT, means for determining an uplink timing for the first uplink transmission of the first RAT based at least in part on the reference timing of the second RAT, and means for transmitting the first uplink transmission using the uplink timing.

Another apparatus for wireless communication is described. The apparatus may include a processor, memory in electronic communication with the processor, and instructions stored in the memory. The instructions may be operable to cause the processor to identify a first uplink transmission that is to be transmitted using a first RAT, identify a reference timing of a second RAT that is different than the first RAT, determine an uplink timing for the first uplink transmission of the first RAT based at least in part on the reference timing of the second RAT, and transmit the first uplink transmission using the uplink timing.

A non-transitory computer readable medium for wireless communication is described. The non-transitory computer-readable medium may include instructions operable to cause a processor to identify a first uplink transmission that is to be transmitted using a first RAT, identify a reference timing of a second RAT that is different than the first RAT, determine an uplink timing for the first uplink transmission of the first RAT based at least in part on the reference timing of the second RAT, and transmit the first uplink transmission using the uplink timing.

In some examples of the method, apparatus, and non-transitory computer-readable medium described above, the determining the uplink timing further comprises identifying a timing advance group (TAG) of the first RAT having a timing advance (TA) that may be based at least in part on the reference timing of the second RAT. In some examples of the method, apparatus, and non-transitory computer-readable medium described above, a transmitter of the downlink transmission of the second RAT may be colocated with a receiver of the first uplink transmission.

In some examples of the method, apparatus, and non-transitory computer-readable medium described above, the first uplink transmission may be a supplemental uplink transmission of the first RAT, and wherein the method further comprises receiving a downlink transmission of the first RAT transmitted using a higher frequency that may be in a different frequency band than a frequency of the supplemental uplink transmission. In some examples of the method, apparatus, and non-transitory computer-readable medium described above, the downlink transmission of the first RAT may not be used to determine the uplink timing for the supplemental uplink transmission.

Some examples of the method, apparatus, and non-transitory computer-readable medium described above may further include processes, features, means, or instructions for receiving configuration information linking the uplink timing for the first uplink transmission of the first RAT to the reference timing of the second RAT. In some examples of the method, apparatus, and non-transitory computer-readable medium described above, the configuration information may be received in RRC signaling from a base station of the first RAT. In some examples of the method, apparatus, and non-transitory computer-readable medium described above, the first RAT may be a NR or 5G RAT, and the second RAT may be a LTE or 4G RAT.

A method of wireless communication is described. The method may include identifying a first uplink transmission that is to be transmitted using a first RAT, identifying a received power of a downlink transmission of a second RAT that is different than the first RAT or a reference timing of the second RAT, determining a received power of a downlink transmission of a second RAT that is different than the first RAT or an uplink timing for the first uplink transmission of the first RAT based at least in part on the reference timing of the second RAT, and transmitting the first uplink transmission using the first uplink transmission power or the uplink timing.

An apparatus for wireless communication is described. The apparatus may include means for identifying a first uplink transmission that is to be transmitted using a first RAT, means for identifying a received power of a downlink transmission of a second RAT that is different than the first RAT or a reference timing of the second RAT, means for determining a received power of a downlink transmission of a second RAT that is different than the first RAT or an uplink timing for the first uplink transmission of the first RAT based at least in part on the reference timing of the second RAT, and means for transmitting the first uplink transmission using the first uplink transmission power or the uplink timing.

Another apparatus for wireless communication is described. The apparatus may include a processor, memory in electronic communication with the processor, and instructions stored in the memory. The instructions may be operable to cause the processor to identify a first uplink transmission that is to be transmitted using a first RAT, identify a received power of a downlink transmission of a second RAT that is different than the first RAT or a reference timing of the second RAT, determine a received power of a downlink transmission of a second RAT that is different than the first RAT or an uplink timing for the first uplink transmission of the first RAT based at least in part on the reference timing of the second RAT, and transmit the first uplink transmission using the first uplink transmission power or the uplink timing.

A non-transitory computer readable medium for wireless communication is described. The non-transitory computer-readable medium may include instructions operable to cause a processor to identify a first uplink transmission that is to be transmitted using a first RAT, identify a received power of a downlink transmission of a second RAT that is different than the first RAT or a reference timing of the second RAT, determine a received power of a downlink transmission of a second RAT that is different than the first RAT or an uplink timing for the first uplink transmission of the first RAT based at least in part on the reference timing of the second RAT, and transmit the first uplink transmission using the first uplink transmission power or the uplink timing.

In some examples of the method, apparatus, and non-transitory computer-readable medium described above, the determining the first uplink transmission power or the uplink timing comprises determining the uplink timing, and the determining the uplink timing further comprises identifying a timing advance group (TAG) of the first RAT having a timing advance (TA) that may be based at least in part on the reference timing of the second RAT. In some examples of the method, apparatus, and non-transitory computer-readable medium described above, transmitting the first uplink transmission using the first uplink transmission power or the uplink timing comprises using the uplink timing, and a transmitter of the downlink transmission of the second RAT may be colocated with a receiver of the first uplink transmission.

In some examples of the method, apparatus, and non-transitory computer-readable medium described above, the first uplink transmission may be a supplemental uplink transmission of the first RAT, and wherein the method further comprises receiving a downlink transmission of the first RAT transmitted using a higher frequency that may be in a different frequency band than a frequency of the supplemental uplink transmission. In some examples of the method, apparatus, and non-transitory computer-readable medium described above, the downlink transmission of the first RAT may not be used to determine the uplink timing for the supplemental uplink transmission.

Some examples of the method, apparatus, and non-transitory computer-readable medium described above may further include processes, features, means, or instructions for receiving configuration information linking the uplink timing for the first uplink transmission of the first RAT to the reference timing of the second RAT, where transmitting the first uplink transmission using the first uplink transmission power or the uplink timing comprises using the uplink timing. In some examples of the method, apparatus, and non-transitory computer-readable medium described above, the configuration information may be received in RRC signaling from a base station of the first RAT. In some examples of the method, apparatus, and non-transitory computer-readable medium described above, transmitting the first uplink transmission using the first uplink transmission power or the uplink timing comprises using the uplink timing, and the first RAT may be a NR or 5G RAT, and the second RAT may be a LTE or 4G RAT.

A method of wireless communication is described. The method may include establishing a first connection with a first base station using a first RAT and a second connection with the first base station using a second RAT, determining that the second connection is to be handed over to a second base station, and initiating a handover of the first connection based at least in part on the determining that the second connection is to be handed over.

An apparatus for wireless communication is described. The apparatus may include means for establishing a first connection with a first base station using a first RAT and a second connection with the first base station using a second RAT, means for determining that the second connection is to be handed over to a second base station, and means for initiating a handover of the first connection based at least in part on the determining that the second connection is to be handed over.

Another apparatus for wireless communication is described. The apparatus may include a processor, memory in electronic communication with the processor, and instructions stored in the memory. The instructions may be operable to cause the processor to establish a first connection with a first base station using a first RAT and a second connection with the first base station using a second RAT, determine that the second connection is to be handed over to a second base station, and initiate a handover of the first connection based at least in part on the determining that the second connection is to be handed over.

A non-transitory computer readable medium for wireless communication is described. The non-transitory computer-readable medium may include instructions operable to cause a processor to establish a first connection with a first base station using a first RAT and a second connection with the first base station using a second RAT, determine that the second connection is to be handed over to a second base station, and initiate a handover of the first connection based at least in part on the determining that the second connection is to be handed over.

In some examples of the method, apparatus, and non-transitory computer-readable medium described above, the second connection with the first base station using the second RAT may be an anchor carrier connection and the first connection with the first base station may be a supplemental uplink connection using the first RAT. Some examples of the method, apparatus, and non-transitory computer-readable medium described above may further include processes, features, means, or instructions for establishing a third connection, using the first RAT, with the first base station or a different base station. In some examples of the method, apparatus, and non-transitory computer-readable medium described above, the handover of the first connection may be performed independently of a second handover of the third connection. In some examples of the method, apparatus, and non-transitory computer-readable medium described above, the first base station includes a first serving cell for the first RAT that may be collocated with a second serving cell for the second RAT.

Some examples of the method, apparatus, and non-transitory computer-readable medium described above may further include processes, features, means, or instructions for receiving configuration information linking the handover for the first connection to the handover of the second connection. In some examples of the method, apparatus, and non-transitory computer-readable medium described above, the configuration information may be received in RRC signaling from the first base station. In some examples of the method, apparatus, and non-transitory computer-readable medium described above, the first RAT may be a NR or 5G RAT, and the second RAT may be a LTE or 4G RAT.

DETAILED DESCRIPTION

Figure 1:
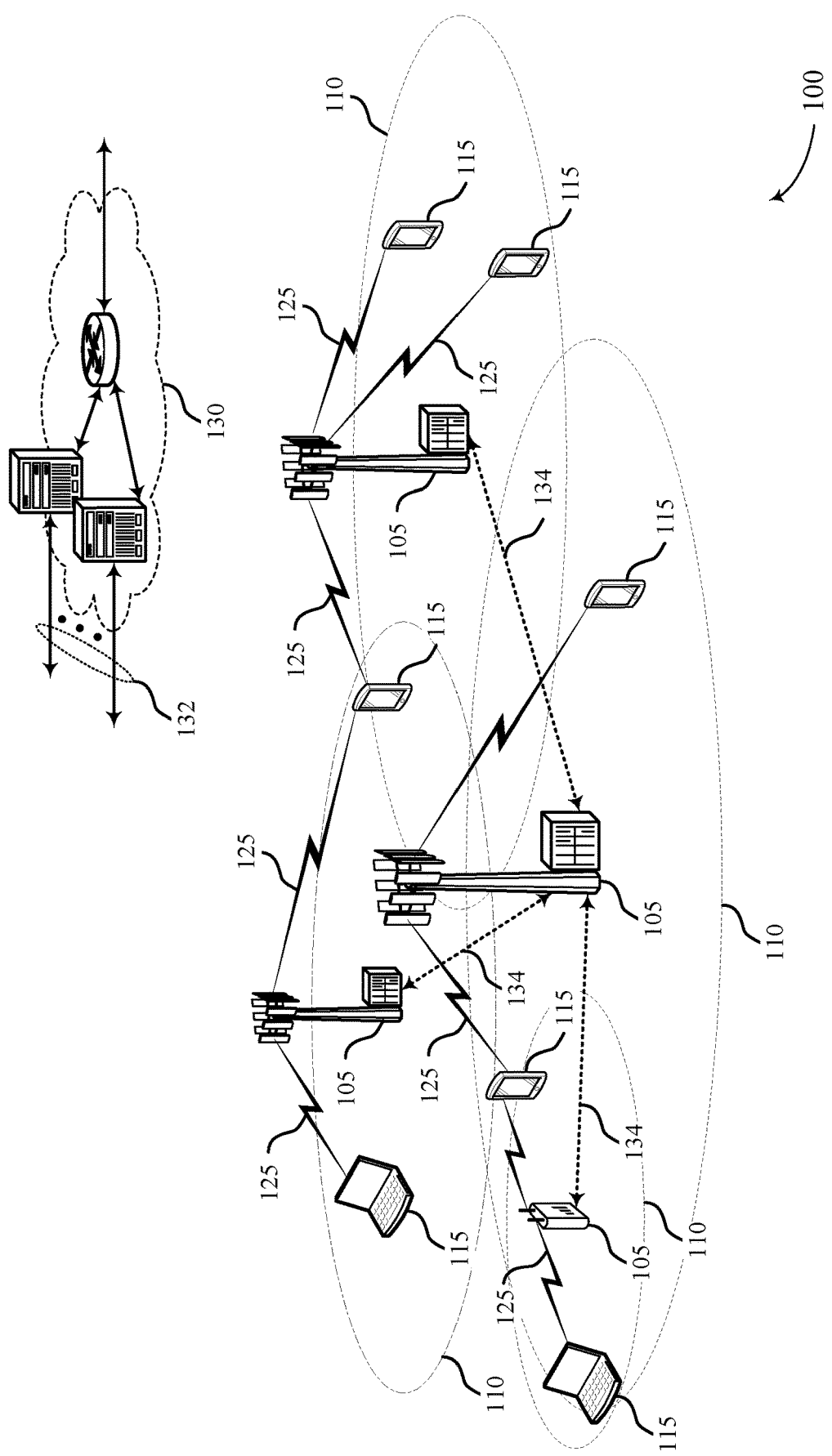
FIG. 1 illustrates an example of a wireless communications system that supports mobility and power control techniques across multiple radio access technologies in accordance with aspects of the present disclosure.

Various described techniques provide for one or more aspects of a first transmission of a first radio access technology (RAT) (e.g., a 5G or New Radio (NR) RAT), to be determined based on transmissions of a second RAT (e.g., a 4G or Long Term Evolution (LTE) RAT). In some cases, a user equipment (UE) may establish a connection using the first RAT that has a high-band component and a low-band component that may each use wireless channels in different frequency bands. In some cases, the low-band component may be in a lower frequency band than the high-band component, and may be used for supplemental uplink (SUL) transmissions from the UE. Further, SUL transmissions of the first RAT using the low-band component may not have an associated downlink transmission. In various examples, aspects of the low-band component of the first RAT may be determined based on one or more downlink transmissions of the second RAT. In some cases, the UE may identify a received power of a downlink transmission of the second RAT, and determine an uplink transmission power for SUL transmissions of the first RAT based at least in part on the received power of the second RAT. In some cases, a reference timing of the second RAT may be used to determine an uplink timing for SUL transmissions of the first RAT. In some cases, the UE may establish a first connection with a first base station using the first RAT and establish a second connection with the first base station using the second RAT, and initiate a handover of the first connection based on determining that the second connection is to be handed over to a second base station.

In some cases, a UE may have a capability to communicate using two or more RATs, such as a 5G or NR RAT and a 4G or LTE RAT. Furthermore, in some cases base stations using the two or more RATs may have overlapping coverage areas, and in some cases a base station may have co-located transmitters for the two or more RATs. For example, a base station may have a colocated NR cell and LTE cell. For example, the NR cell and LTE cell may be colocated at a same call site, at a same antenna tower, on a same antenna mast, or at a same antenna or set antennas.

In some cases, a first set of base stations may support both an NR cell and an LTE cell, and a second set of base stations may support only NR cells. In such cases, the first set of base stations may use low-band transmissions in a lower frequency band (e.g., a 600 MHz frequency band) and the second set of base stations may use high-band transmissions in a higher frequency band (e.g., a 4 GHz frequency band). UE uplink transmissions on the high-band transmissions may lead, in some cases, to link budget limitations (e.g., due to higher propagation loss of high-band transmissions relative to low-band transmissions), and in some cases high-band transmissions are time-division duplexing (TDD) transmissions with relatively low duty cycle uplink transmissions. In such cases, the low-band SUL transmissions may be beneficial to provide additional uplink transmission capacity to a UE. Furthermore, in some cases the NR SUL transmissions may not have corresponding low-band downlink transmissions. In such cases, a UE may not have associated low-band downlink transmissions for purposes of power control, reference timing, and handover determinations. Various aspects of the present disclosure provide techniques for such power control, reference timing, and handover determinations.

Various aspects of the present disclosure, as indicated above, provide for one or more aspects of a first transmission of a first RAT, to be determined based on transmissions of a second RAT. In some cases, a UE may identify a received power of a downlink transmission of the second RAT, such as a downlink reference signal transmission of the second RAT. In some cases, the downlink transmission of the second RAT may be from a cell that is colocated with a cell that receives the first uplink transmission of the second RAT. The UE may determine an uplink transmission power for the first uplink transmission of the first RAT based at least in part on the received power of the downlink transmission of the second RAT. Additionally or alternatively, a reference timing of the second RAT may be used to determine an uplink timing for the first uplink transmission. In some cases, the UE may establish a first connection with the first RAT cell and establish a second connection with the second RAT cell that is colocated with the first RAT cell, and initiate a handover of the first connection based on determining that the second connection is to be handed over.

Aspects of the disclosure are initially described in the context of a wireless communications system. Aspects of the disclosure are further illustrated by and described with reference to apparatus diagrams, system diagrams, and flowcharts that relate to mobility and power control techniques across multiple radio access technologies.

FIG. 1 illustrates an example of a wireless communications system 100 that supports mobility and power control techniques across multiple radio access technologies in accordance with aspects of the present disclosure. The wireless communications system 100 includes base stations 105, UEs 115, and a core network 130. In some examples, the wireless communications system 100 may be a LTE network, an LTE-Advanced (LTE-A) network, a NR network, or support one or more thereof. In some cases, wireless communications system 100 may support enhanced broadband communications, ultra-reliable (e.g., mission critical) communications, low latency communications, or communications with low-cost and low-complexity devices. In some cases, mobility, timing, or power control aspects of one RAT may be used to determine mobility, timing, or power control for one or more transmissions of a second RAT.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support beamformed millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (UTRA) (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform-spread-OFDM (DFT-S-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some examples, each served UE 115 may be configured to operate over portions or all of the carrier bandwidth. In other examples, some UEs 115 may be configured to operate using a narrowband protocol type that is associated with a predefined portion or range (e.g., set of subcarriers or RBs) within a carrier (e.g., "in-band" deployment of a narrowband protocol type). In some cases, a UE 115 may be configured with one or more high-band carriers and one or more low-band SUL carriers. In some cases, a low-band SUL carrier may not have an associated downlink transmission, and a UE 115 may identify a downlink transmission of a different RAT (e.g., a downlink transmission of a same or relatively close frequency band as the frequency band for the SUL carrier) and use one or more measurements of the identified downlink transmission to determine an uplink transmission power for the low-band SUL transmissions, timing information for the low-band SUL transmissions, whether to handover the low-band SUL transmissions to a different base station, or any combination thereof.

Figure 2:
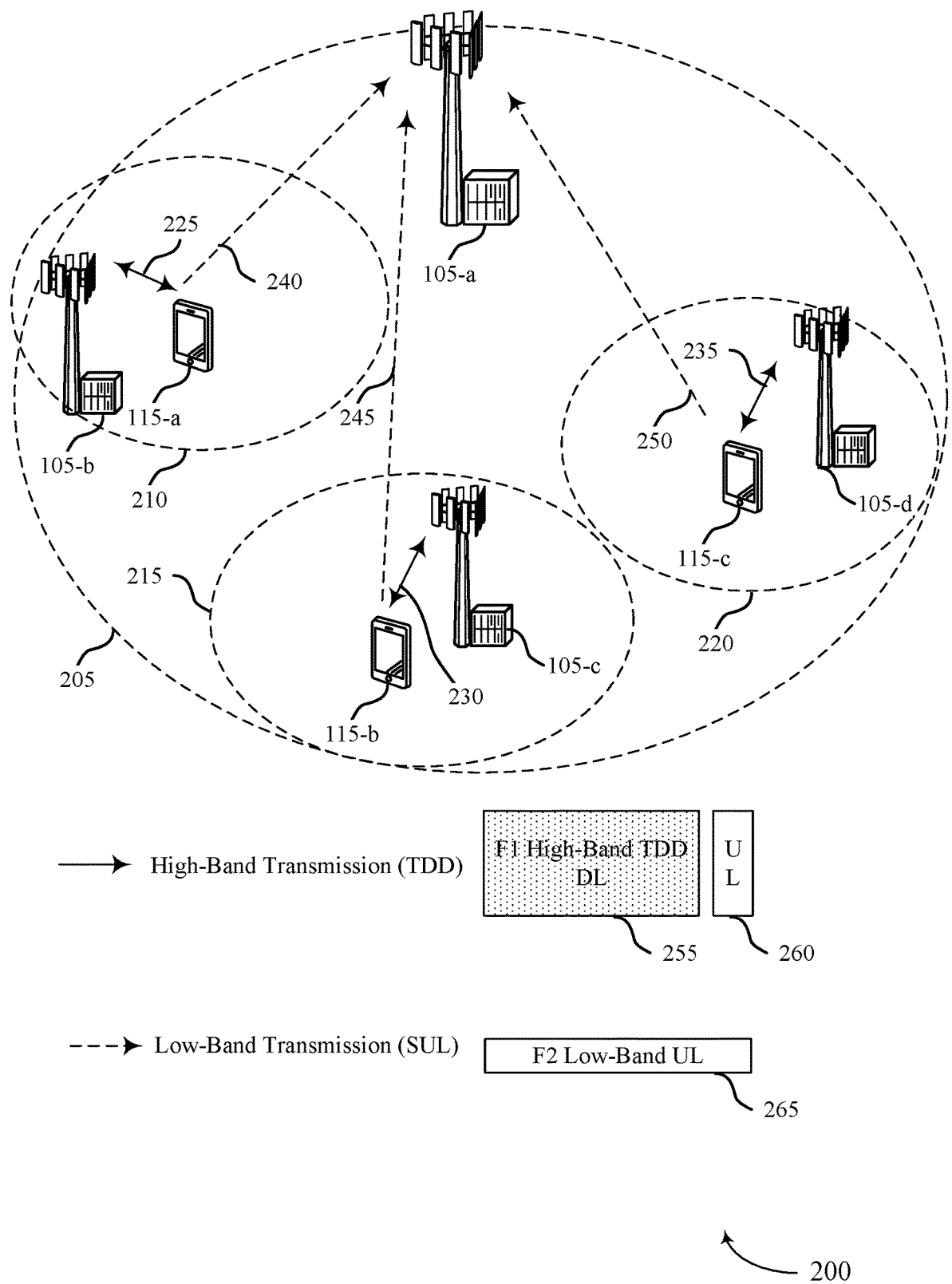
FIG. 2 illustrates an example of a portion of a wireless communications system that supports mobility and power control techniques across multiple radio access technologies in accordance with aspects of the present disclosure.

FIG. 2 illustrates an example of a portion of a wireless communications system 200 that supports mobility and power control techniques across multiple radio access technologies in accordance with aspects of the present disclosure. In some examples, wireless communications system 200 may implement aspects of wireless communications system 100. In the example of FIG. 2, the wireless communications system 200 may include a first base station 105-$a$, a second base station 105-$b$, a third base station 105-$c$, and a fourth base station 105-$d$, which may be examples of base stations 105 of FIG. 1. The wireless communications system 200 may also include a first UE 115-$a$, a second UE 115-$b$, and a third UE 115-$c$, which may be examples of UEs of FIG. 1.

In this example, the first base station 105-$a$ may have a relatively large first geographic coverage area 205, and may support transmissions at relatively low frequencies. For example, the first base station 105-$a$ may support SUL transmissions. The second base station 105-$b$ may have a relatively small second geographic coverage area 210, and may support transmissions at relatively high frequencies. Likewise, the third base station 105-$c$ may have a relatively small third geographic coverage area 215, and the fourth base station 105-$d$ may have a relatively small fourth geographic coverage area 220, and each of the third base station 105-$c$ and fourth base station 105-$d$ may support transmissions at relatively high frequencies. In this example, the first UE 115-$a$ may have a high-band connection 225 established with the second base station 105-$b$, and may transmit a low-band transmission 240 to the first base station 105-$a$. Similarly, the second UE 115-$b$ may have a high-band connection 230 established with the third base station 105-$c$, and transmit a low-band transmission 245 to the first base station 105-$a$. Likewise, the third UE 115-$c$ may have a high-band connection 235 established with the fourth base station 105-$d$, and may transmit a low-band transmission 250 to the first base station 105-$a$.

The high-band connections 225, 230, and 235 may use relatively high frequencies, as indicated above. In some examples, the high-band connections 225, 230, and 235 may use frequencies in the area of 4 GHz or higher. In some cases, the high-band connections 225, 230, and 235 may be beamformed mmW transmissions. The low-band transmissions 240, 245, and 250 may use relatively low frequencies, such as frequencies in the area of 600 MHz. In some cases, the low-band transmissions 240, 245, and 250 may be uplink only transmissions according to SUL transmission techniques. In some examples, the high-band connections 225, 230, and 235 may be TDD transmissions having a high-band TDD downlink portion 255 and a high-band TDD uplink portion 260. The low-band transmissions 240, 245, and 250 may have low-band uplink portions 265.

As indicated above, the high-band connections 225, 230, and 235 may lead, in some cases, to link budget limitations (e.g., due to higher propagation loss of high-band transmissions relative to low-band transmissions), and the low-band transmissions 240, 245, and 250 may be SUL transmissions that enhance uplink transmissions of the high-band connections 225, 230, and 235. Furthermore, as indicated above, the low-band transmissions 240, 245, and 250 may not have corresponding low-band downlink transmissions. In some cases, a UE 115 may rely on a paired downlink transmission to determine uplink power control or timing of associated uplink transmissions. Since the low-band transmissions 240, 245, and 250 in this example do not have such paired downlink transmissions, other techniques may be used to determine uplink power control or timing information. In some cases, the UEs 115 may be configured to use a closed loop power control technique. In some cases, an uplink transmit power $P_{PUSCH,c}$ may be determined according to the following equation:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

[dBm], where $P_{CMAX,c}(i)$ for subframe (i) is a maximum uplink transmit power, $M_{PUSCH,c}(i)$ is the number of resource blocks (RBs) of the SUL transmission, $P_{O\_PUSCH,c}(j)$ is the reference transmit power for the SUL data channel where j corresponds to a semi-persistent or random access transmission, $\alpha_c(j)$ is a fractional power control parameter, $PL_c$ pathloss component (e.g., computed as a reference signal transmission power minus a reference signal received power (RSRP)), $\Delta_{TF,c}(i)$ is a transmission format adjustment, and $f_c(i)$ is a power control adjustment.

In some examples the UEs 115 may set the $\alpha_c(j)$ to zero, and the value of $P_{O\_PUSCH,c}(j)$ may be configured via control signaling (e.g., RRC signaling). In such cases, the UEs 115 may be configured with a fixed transmission power as a starting transmission power, and closed-loop power control signaling may be used to adjust the transmission power through indications of $P_{O\_PUSCH,c}(j)$ values. A UE 115 may, in some examples, initiate a random access transmission using the fixed starting transmit power and perform power ramping based on open-loop random access power techniques until closed-loop power control is established. In other examples, such as described with reference to FIG. 3, open loop power control techniques may be implemented by using one or more transmissions of a different RAT to perform measurements used for determining uplink power.

Figure 3:
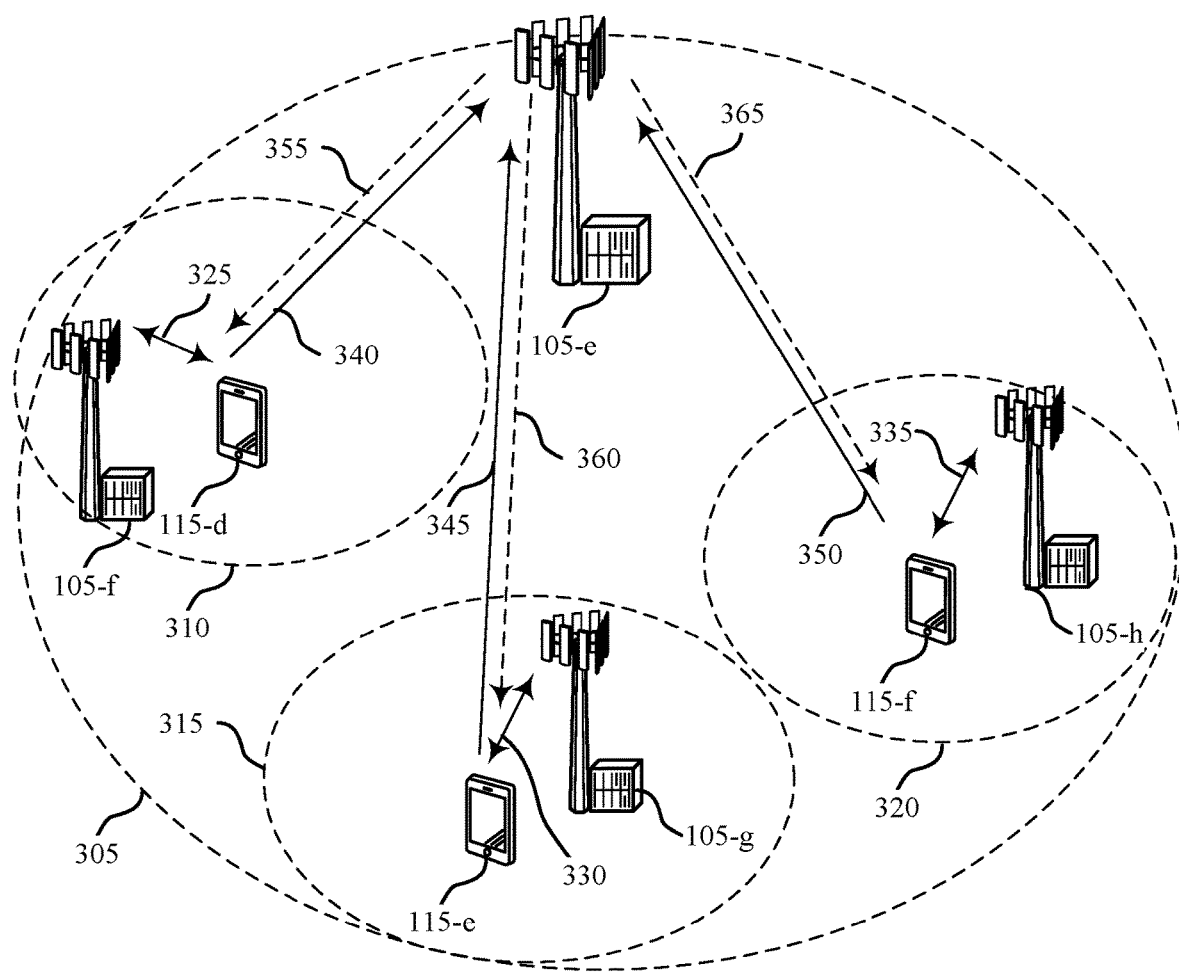
FIG. 3 illustrates an example of a portion of a wireless communications system with multiple radio access technologies having overlapping coverage areas that supports mobility and power control techniques across multiple radio access technologies in accordance with aspects of the present disclosure.

FIG. 3 illustrates an example of a portion of a wireless communications system 300 with multiple radio access technologies having overlapping coverage areas that supports mobility and power control techniques across multiple radio access technologies in accordance with aspects of the present disclosure. In some examples, wireless communications system 300 may implement aspects of wireless communications system 100. In the example of FIG. 3, the wireless communications system 300 may include a first base station 105-*e*, a second base station 105-*f*, a third base station 105-*g*, and a fourth base station 105-*h*, which may be examples of base stations 105 of FIG. 1. The wireless communications system 300 may also include a first UE 115-*d*, a second UE 115-*e*, and a third UE 115-*f*, which may be examples of UEs of FIG. 1.

In this example, the first base station 105-*e* may have a relatively large first geographic coverage area 305, and may support transmissions at relatively low frequencies. For example, the first base station 105-*e* may support low-band transmissions. The second base station 105-*f* may have a relatively small second geographic coverage area 310, and may support transmissions at relatively high frequencies. Likewise, the third base station 105-*g* may have a relatively small third geographic coverage area 315, and the fourth base station 105-*h* may have a relatively small fourth geographic coverage area 320, and each of the third base station 105-*g* and fourth base station 105-*h* may support transmissions at relatively high frequencies. In this example, the first UE 115-*d* may have a high-band connection 325 established with the second base station 105-*f*, and may transmit a low-band transmission 340 to the first base station 105-*e*. Similarly, the second UE 115-*e* may have a high-band connection 330 established with the third base station 105-*g*, and may transmit a low-band transmission 345 to the first base station 105-*e*. Likewise, the third UE 115-*f* may have a high-band connection 335 established with the fourth base station 105-*h*, and may transmit a low-band transmission 350 to the first base station 105-*e*.

The high-band connections 325, 330, and 335 may use relatively high frequencies, as indicated above (e.g., using frequencies in the area of 4 GHz or higher, or beamformed mmW transmissions). The low-band transmissions 340, 345, and 350 may use relatively low frequencies, such as frequencies in the area of 600 MHz. In some cases, the low-band transmissions 340, 345, and 350 may be uplink only transmissions according to SUL transmission techniques. In some examples, the high-band connections 325, 330, and 335 may be TDD transmissions such as discussed above with reference to FIG. 2, and the low-band transmissions 340, 345, and 350 may be low-band uplink transmissions such as discussed above with reference to FIG. 2.

In the example of FIG. 3, the first base station 105-*e* may support communications using multiple RATs (e.g., a 4G RAT and a 5G RAT). In such cases, the low-band transmissions 340, 345, and 350 may be transmissions of a first RAT (e.g., a 5G or NR RAT), and the first base station 105-*e* may also transmit downlink transmissions of a second RAT (e.g., a 4G or LTE RAT), such as downlink reference signals of the second RAT. In this example, the first base station 105-*e* may transmit a first downlink signal 355 that may be received at the first UE 115-*d*, a second downlink signal 360 that may be received at the second UE 115-*e*, and a third downlink signal 365 that may be received at the third UE 115-*f*. In such cases, each of the UEs 115 may determine an uplink transmit power $P_{PUSCH,c}$ according to the above-described uplink transmit power equation:

$$P_{PUSCH,c}(i) = \min$$
$$\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$
[dBm].

The various components are the same as discussed with reference to FIG. 2, and in this case the UEs 115 perform open loop power control by not setting the value of $\alpha_c(j)$ to zero, but instead setting this factor according to established fractional power control techniques, and using the reference signals of the downlink signals 355, 360, and 365 to compute $PL_c$. In some examples, the first base station 105-*e* may transmit LTE downlink reference signals according to established techniques, and each UE may measure a RSRP of the downlink reference signal and compute $PL_c$ based on a transmit power of the reference signal less the RSRP. In such cases, the UEs 115 may select downlink carrier frequencies on which to measure RSRP as frequencies that are relatively close to frequencies used for the SUL low-band transmissions 340, 345, and 350. In some cases, a receiver of the SUL low-band transmissions 340, 345, and 350 may be co-located with a transmitter of the downlink signals 355, 360, and 365, and thus power control of the SUL low-band transmissions 340, 345, and 350 based on measurements of the downlink signals 355, 360, and 365 may provide accurate uplink transmission power. In some cases, the UEs 115 may be configured, such as via RRC signaling, with a cell of the first base station 105-*e* that is to be used for measuring downlink reference signals for purposes of computing the pathloss parameter for uplink power control.

Furthermore, in some cases, one or more timing parameters associated with the SUL low-band transmissions 340, 345, and 350 may be determined based on measurements of the downlink signals 355, 360, and 365. As indicated above, the SUL low-band transmissions 340, 345, and 350 do not have paired downlink transmissions, and thus timing information for the SUL low-band transmissions 340, 345, and 350 may also be determined based on the downlink signals 355, 360, and 365. In some cases, timing information of the LTE cell associated with the downlink signals 355, 360, and 365 may be used to determine uplink timing of the SUL low-band transmissions 340, 345, and 350. Such timing information may be used on timing advance groups (TAGs) of the LTE cell and determined according to established LTE timing advance techniques.

Figure 4:
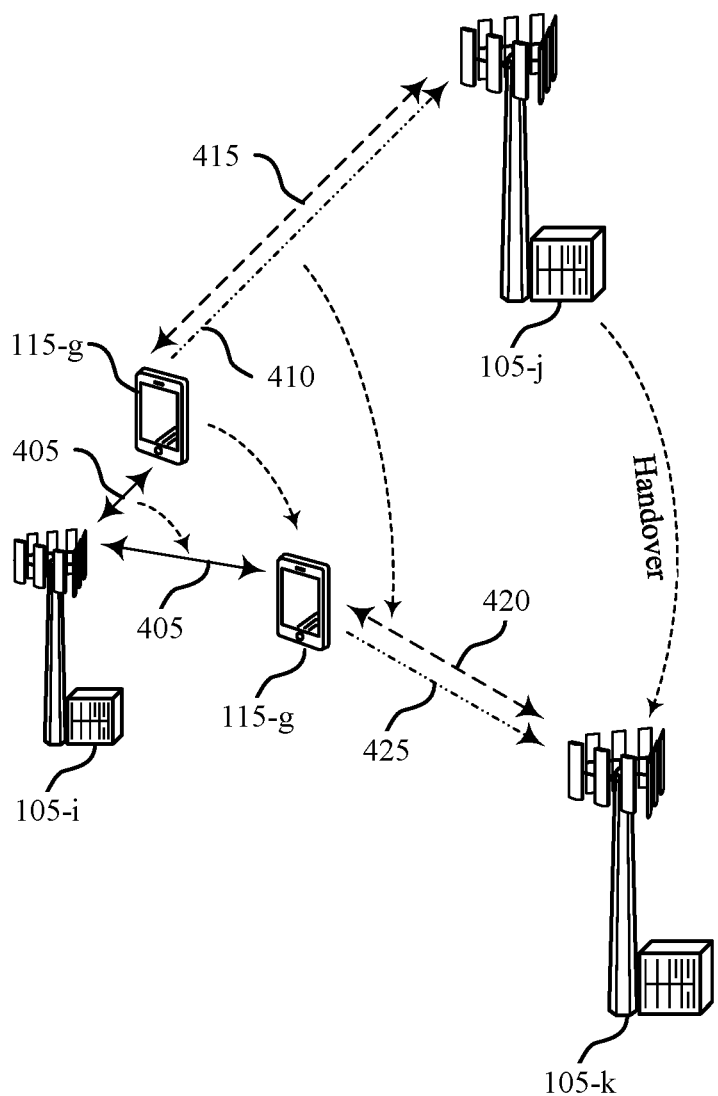
FIG. 4 illustrates an example of handover between base stations of a wireless communications system that supports mobility and power control techniques across multiple radio access technologies in accordance with aspects of the present disclosure.

FIG. 4 illustrates an example of handover between base stations of a wireless communications system 400 that supports mobility and power control techniques across multiple radio access technologies in accordance with aspects of the present disclosure. In some examples, wireless communications system 400 may implement aspects of wireless communications systems 100, 200, or 300. In the example of FIG. 4, the wireless communications system 500 may include a first base station 105-$i$, a second base station 105-$j$, and a second base station 105-$k$ which may be examples of base stations 105 of FIG. 1, 2, or 3. The wireless communications system 300 may also include a UE 115-$g$, which may be an example of UEs of FIG. 1, 2, or 3.

In this example, the first base station 105-$i$ may support a high-band connection 405 on a first RAT, such as a 5G or NR RAT. The UE 115-$g$ may establish the high-band connection 405, and also establish a first low-band SUL transmission 410 to the second base station 105-$j$. Additionally, the UE 115-$g$ may establish a first anchor carrier connection 415 with the second base station 105-$j$. The first anchor carrier connection 415 may be, for example, an LTE or 4G anchor carrier. In this example, the UE 115-$g$ may move from a first location to a second location such that the third base station 105-$k$ may be better able to support the low-band communications with the UE 115-$g$. In such a case, a handover may be initiated to handover the UE 115-$g$ from the second base station 105-$j$ to the third base station 105-$k$. In such a case, the handover may be initiated based on measurements associated with the first anchor carrier connection 415, and may lead to the establishment of a second anchor carrier connection 420 with the third base station 105-$k$. The first low-band SUL transmission 410, in such cases, may also be handed over to the third base station 105-$k$, and a second low-band SUL transmission 425 may be made from the UE 115-$g$ to the third base station 105-$k$. In some cases, the UE 115-$g$ may be configured (e.g., via RRC signaling) to handover the first low-band SUL transmission 410 based on the anchor carrier. In this case, the high-band connection 405 may be maintained at the first base station 105-$i$, and thus handover of high-band connections may be performed independently of the handover of low-band connections. In other cases, such as described below and illustrated in FIG. 5, high-band transmissions and low-band transmissions may have handover boundaries aligned, such as when a cell supporting a high-band connection is colocated with a cell supporting low-band SUL transmissions.

Figure 5:
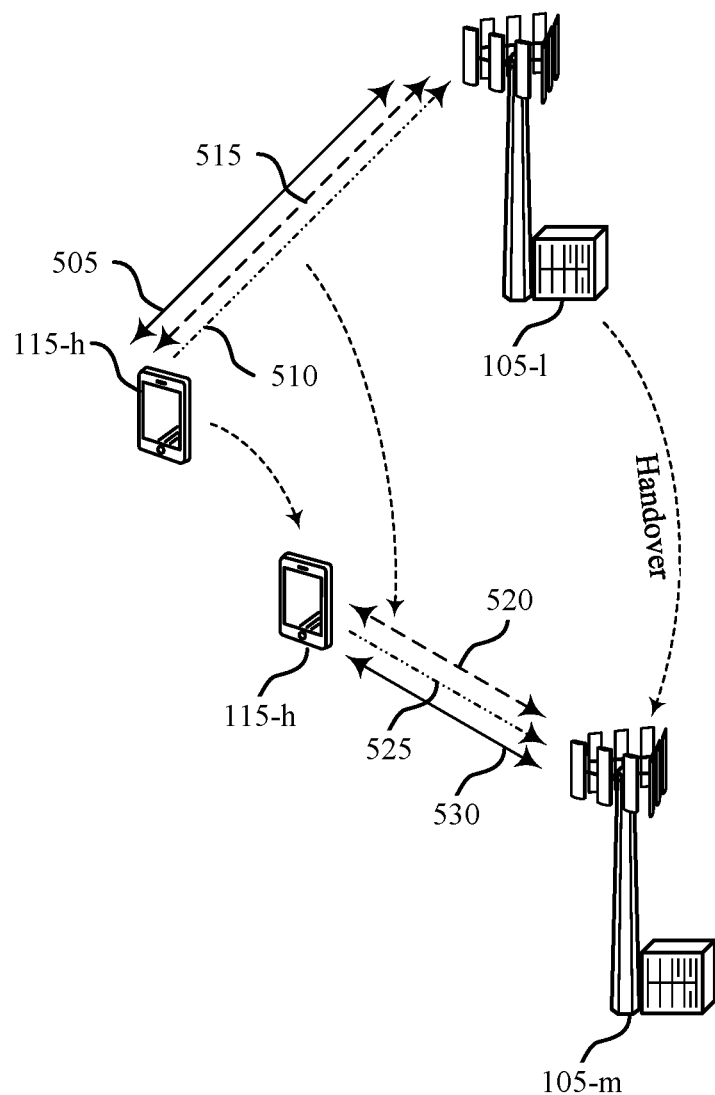
FIG. 5 illustrates another example of handover between base stations of a wireless communications system that supports mobility and power control techniques across multiple radio access technologies in accordance with aspects of the present disclosure.

FIG. 5 illustrates another example of handover between base stations of a wireless communications system 500 that supports mobility and power control techniques across multiple radio access technologies in accordance with aspects of the present disclosure. In some examples, wireless communications system 500 may implement aspects of wireless communications systems 100, 200, or 300. In the example of FIG. 5, the wireless communications system 500 may include a first base station 105-$l$, and a second base station 105-$m$, which may be examples of base stations 105 of FIG. 1, 2, or 3. The wireless communications system 300 may also include a UE 115-$h$, which may be an example of UEs of FIG. 1, 2, or 3.

In this example, the first base station 105-1 may support both a first high-band connection 505 on a first RAT, such as a 5G or NR RAT, and a first low-band SUL transmission 510 on the first RAT. Additionally, the UE 115-$h$ may establish a first anchor carrier connection 515 with the first base station 105-$l$. The first anchor carrier connection 515 may be, for example, an LTE or 4G anchor carrier. In this example, the UE 115-$l$ may move from a first location to a second location such that the second base station 105-$m$ may be better able to support the communications with the UE 115-$h$. In such a case, a handover may be initiated to handover the UE 115-$h$ from the first base station 105-$l$ to the second base station 105-$m$. In such a case, the handover may be initiated based on measurements associated with the first anchor carrier connection 515, and may lead to the establishment of a second anchor carrier connection 520 with the second base station 105-$m$. The first low-band SUL transmission 510 and the first high-band connection 505, in such cases, may also be handed over to the second base station 105-$m$, and a second low-band SUL transmission 525 and a second high-band connection 530 may be made from the UE 115-$h$ to the second base station 105-$m$.

In some cases, the UE 115-$h$ may be configured (e.g., via RRC signaling) to handover the first low-band SUL transmission 510 and the first high-band connection 505 based on the anchor carrier. In this case, the first high-band connection 505 handover may be boundary aligned with low-band connections. Such a technique may be used in some cases where a cell serving the high-band connection is colocated with a cell supporting the SUL low-band transmissions.

Figure 6:
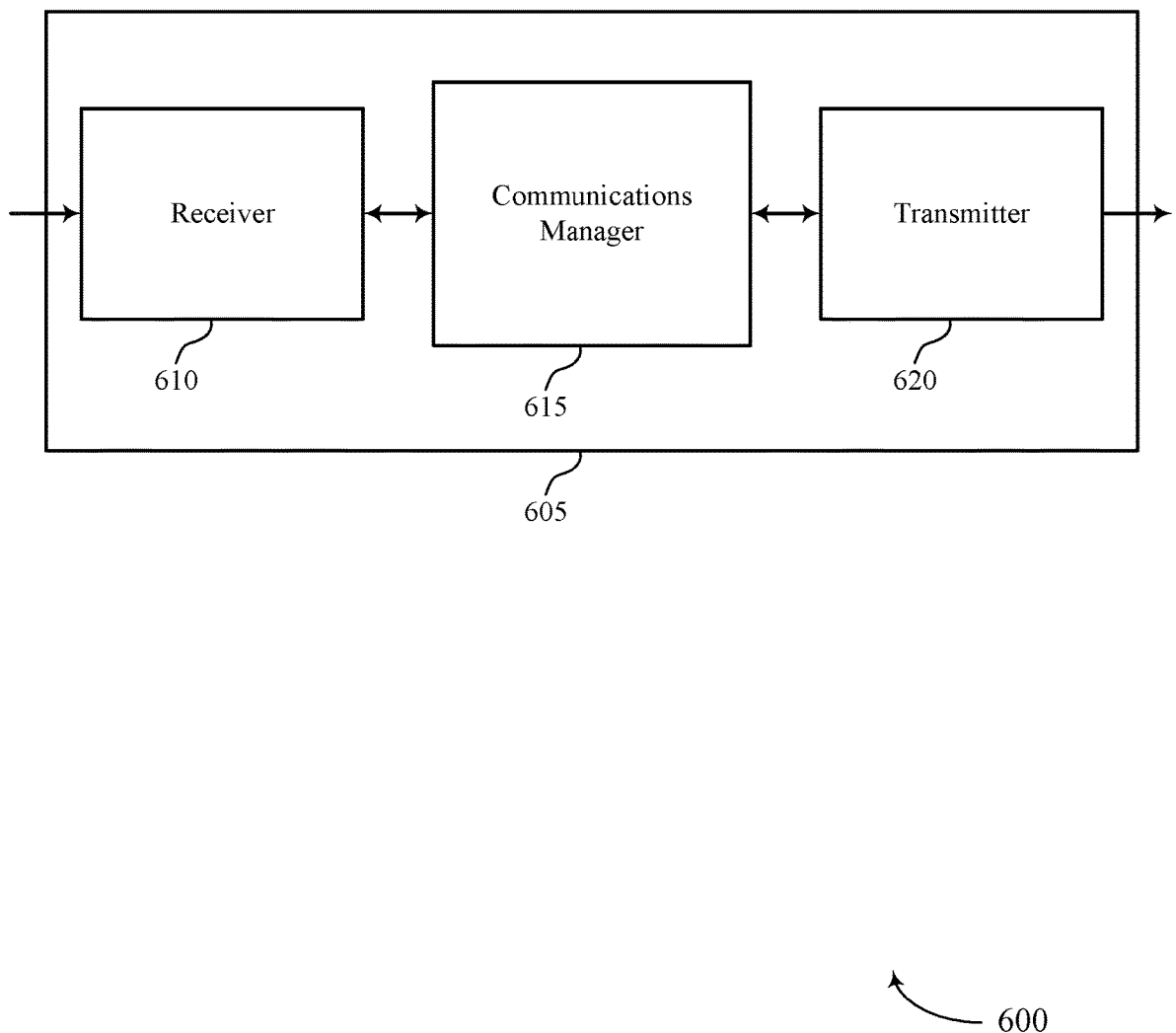
FIGS. 6 and 7 show block diagrams of wireless devices that support mobility and power control techniques across multiple radio access technologies in accordance with aspects of the present disclosure.

FIG. 6 shows a block diagram 600 of a wireless device 605 that supports mobility and power control techniques across multiple radio access technologies in accordance with aspects of the present disclosure. Wireless device 605 may be an example of aspects of a UE 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to mobility and power control techniques across multiple radio access technologies, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may identify a first uplink transmission that is to be transmitted using a first RAT, identify a received power of a downlink transmission of a second RAT that is different than the first RAT, determine a first uplink transmission power for the first uplink transmission of the first RAT based on the received power of the downlink transmission of the second RAT, and transmit the first uplink transmission using the first uplink transmission power.

The communications manager 615 may also identify a first uplink transmission that is to be transmitted using a first RAT, identify a reference timing of a second RAT that is different than the first RAT, determine an uplink timing for the first uplink transmission of the first RAT based on the reference timing of the second RAT, and transmit the first uplink transmission using the uplink timing.

The communications manager 615 may also establish a first connection with a first base station using a first RAT and a second connection with the first base station using a second RAT, determine that the second connection is to be handed over to a second base station, and initiate a handover of the first connection based on the determining that the second connection is to be handed over.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
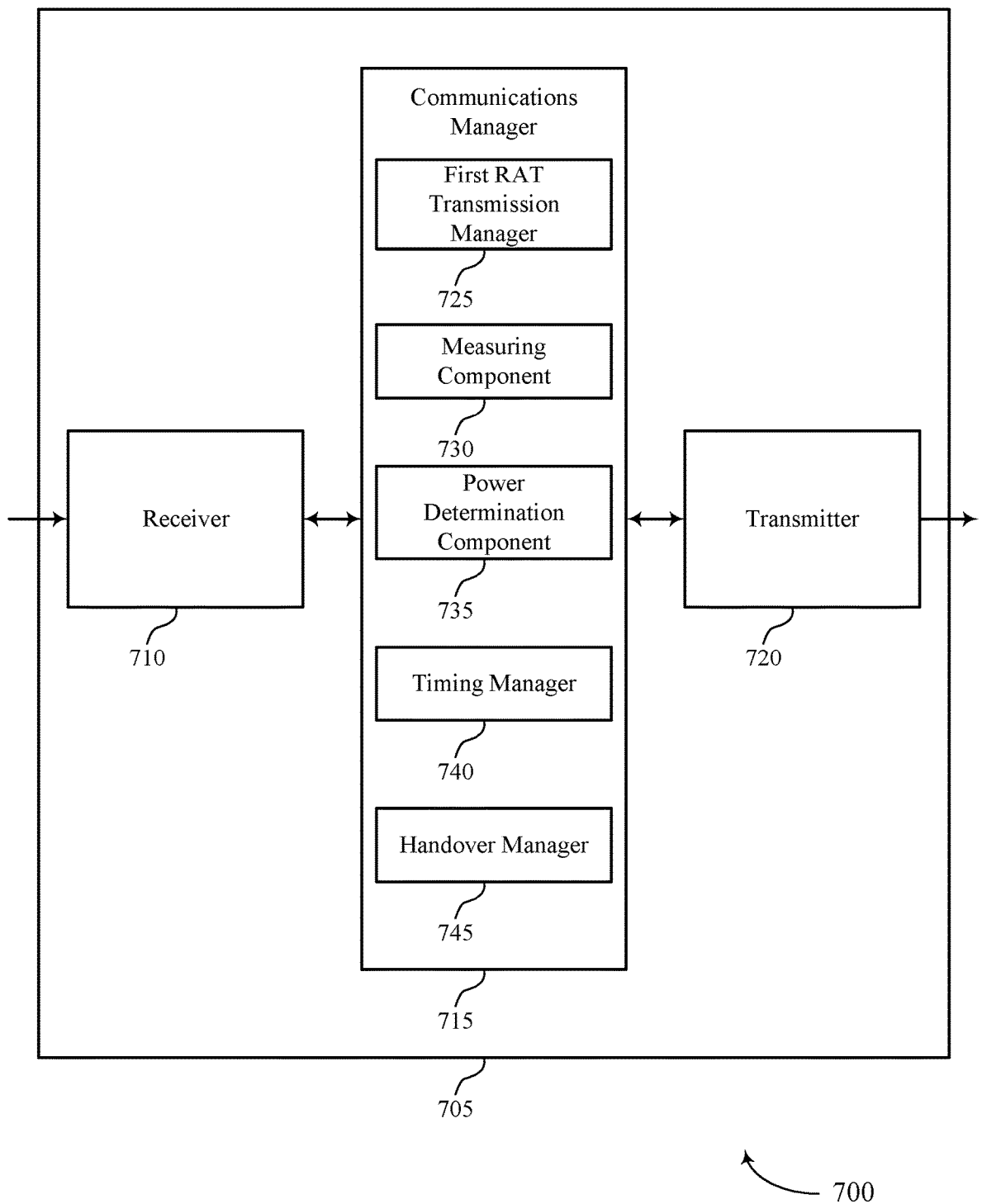

FIG. 7 shows a block diagram 700 of a wireless device 705 that supports mobility and power control techniques across multiple radio access technologies in accordance with aspects of the present disclosure. Wireless device 705 may be an example of aspects of a wireless device 605 or a UE 115 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to mobility and power control techniques across multiple radio access technologies, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include first RAT transmission manager 725, measuring component 730, power determination component 735, timing manager 740, and handover manager 745.

First RAT transmission manager 725 may identify a first uplink transmission that is to be transmitted using a first RAT. The first uplink transmission may use uplink transmission power, uplink timing, or combinations thereof that are determined based on a downlink transmission of a second RAT. The first RAT transmission manager 725 may transmit the first uplink transmission using the uplink timing, and transmit the first uplink transmission using the first uplink transmission power. In some cases, a first connection may be established with a first base station using the first RAT and a second connection may be established with the first base station using a second RAT. In some cases, the first RAT is a NR or 5G RAT, and the second RAT is a LTE or 4G RAT. In some cases, a transmitter of the downlink transmission of the second RAT is colocated with a receiver of the first uplink transmission. In some cases, the downlink transmission of the second RAT is transmitted using a frequency that is within a same frequency band as the frequency of the supplemental uplink transmission. In some cases, the second connection with the first base station using the second RAT is an anchor carrier connection and the first connection with the first base station is a supplemental uplink connection using the first RAT. In some cases, the first base station includes a first serving cell for the first RAT that is collocated with a second serving cell for the second RAT.

Measuring component 730 may identify a received power of a downlink transmission of the second RAT (e.g., a RSRP) that is different than the first RAT. In some cases, the identifying the received power of the downlink transmission of the second RAT further includes identifying the downlink transmission of the second RAT, measuring the received power of the downlink transmission of the second RAT, and determining a pathloss associated with the downlink transmission of the second RAT based on the measured received power.

Power determination component 735 may determine a first uplink transmission power for the first uplink transmission of the first RAT based on the received power of the downlink transmission of the second RAT. In some cases, the determining the first uplink transmission power for the first uplink transmission of the first RAT further includes using the pathloss associated with the downlink transmission of the second RAT as a reference serving cell pathloss in an uplink power calculation for the first uplink transmission of the first RAT.

Timing manager 740 may identify a reference timing of a second RAT that is different than the first RAT and determine an uplink timing for the first uplink transmission of the first RAT based on the reference timing of the second RAT. In some cases, the determining the uplink timing further includes identifying a TAG of the first RAT having a timing advance (TA) that is based on the reference timing of the second RAT.

Handover manager 745 may determine that the second connection is to be handed over to a second base station and initiate a handover of the first connection based on the determining that the second connection is to be handed over. In some cases, the handover of the first connection is performed independently of a second handover of a third connection.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
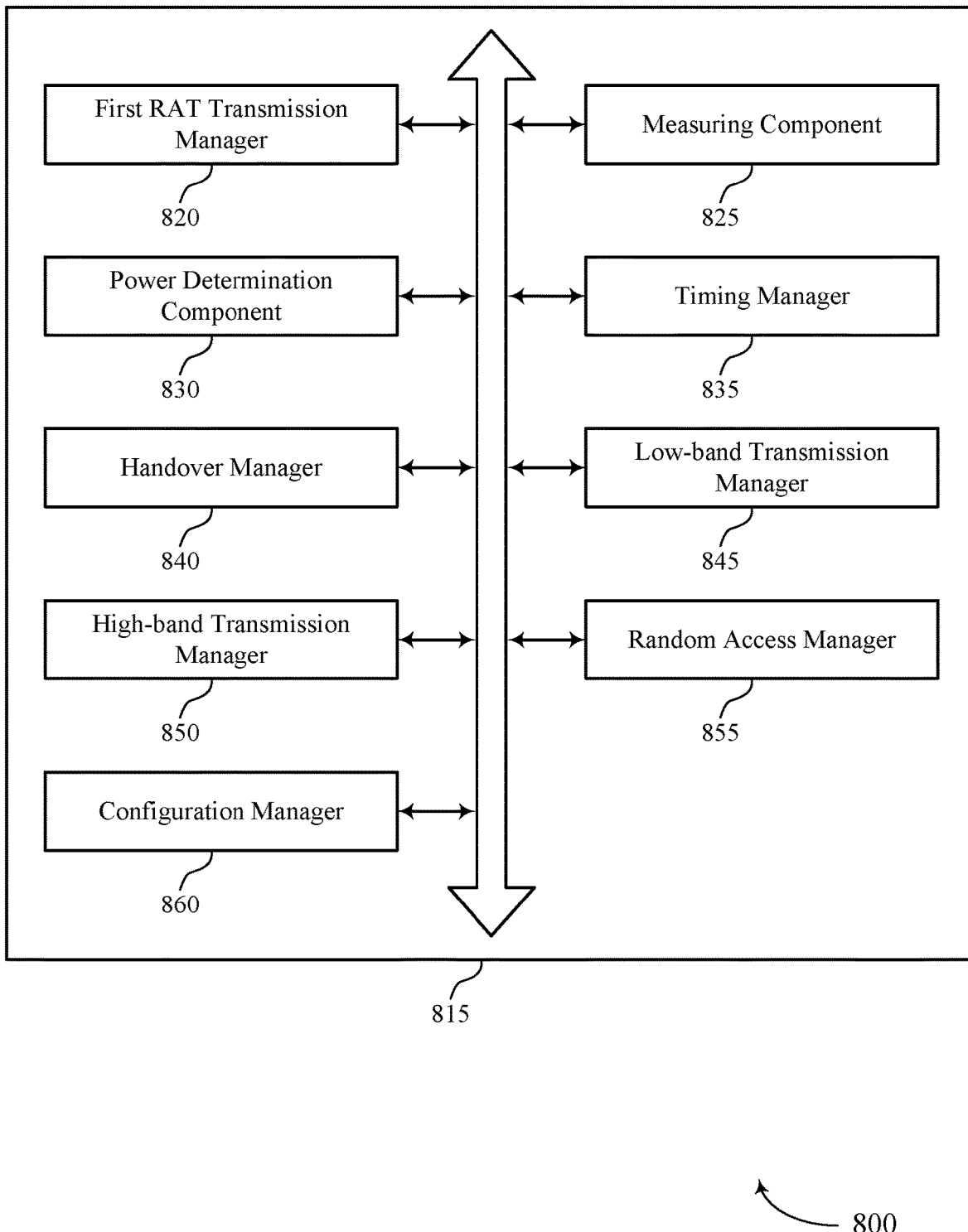
FIG. 8 shows a block diagram of a communications manager that supports mobility and power control techniques across multiple radio access technologies in accordance with aspects of the present disclosure.

FIG. 8 shows a block diagram 800 of a communications manager 815 that supports mobility and power control techniques across multiple radio access technologies in accordance with aspects of the present disclosure. The communications manager 815 may be an example of aspects of a communications manager 615, a communications manager 715, or a communications manager 915 described with reference to FIGS. 6, 7, and 9. The communications manager 815 may include first RAT transmission manager 820, measuring component 825, power determination component 830, timing manager 835, handover manager 840, low-band transmission manager 845, high-band transmission manager 850, random access manager 855, and configuration manager 860. Each of these modules may communicate, directly or indirectly, with one another (e.g., via one or more buses).

First RAT transmission manager 820 may identify a first uplink transmission that is to be transmitted using a first RAT. The first uplink transmission may use uplink transmission power, uplink timing, or combinations thereof that are determined based on a downlink transmission of a second RAT. The first RAT transmission manager 820 may transmit the first uplink transmission using the uplink timing, and transmit the first uplink transmission using the first uplink transmission power. In some cases, a first connection may be established with a first base station using the first RAT and a second connection may be established with the first base station using a second RAT. In some cases, the first RAT is a NR or 5G RAT, and the second RAT is a LTE or 4G RAT. In some cases, a transmitter of the downlink transmission of the second RAT is colocated with a receiver of the first uplink transmission. In some cases, the downlink transmission of the second RAT is transmitted using a frequency that is within a same frequency band as the frequency of the supplemental uplink transmission. In some cases, the second connection with the first base station using the second RAT is an anchor carrier connection and the first connection with the first base station is a supplemental uplink connection using the first RAT. In some cases, the first base station includes a first serving cell for the first RAT that is collocated with a second serving cell for the second RAT.

Measuring component 825 may identify a received power of a downlink transmission of the second RAT (e.g., a RSRP) that is different than the first RAT. In some cases, the identifying the received power of the downlink transmission of the second RAT further includes identifying the downlink transmission of the second RAT, measuring the received power of the downlink transmission of the second RAT, and determining a pathloss associated with the downlink transmission of the second RAT based on the measured received power.

Power determination component 830 may determine a first uplink transmission power for the first uplink transmission of the first RAT based on the received power of the downlink transmission of the second RAT. In some cases, the determining the first uplink transmission power for the first uplink transmission of the first RAT further includes using the pathloss associated with the downlink transmission of the second RAT as a reference serving cell pathloss in an uplink power calculation for the first uplink transmission of the first RAT.

Timing manager 835 may identify a reference timing of a second RAT that is different than the first RAT and determine an uplink timing for the first uplink transmission of the first RAT based on the reference timing of the second RAT. In some cases, the determining the uplink timing further includes identifying a TAG of the first RAT having a TA that is based on the reference timing of the second RAT.

Handover manager 840 may determine that the second connection is to be handed over to a second base station and initiate a handover of the first connection based on the determining that the second connection is to be handed over. In some cases, the handover of the first connection is performed independently of a second handover of the third connection.

Low-band transmission manager 845 may manage one or more low-band SUL transmissions. In some cases, the first uplink transmission is a supplemental uplink transmission (e.g., a low-band supplemental uplink transmission) of the first RAT, and where a downlink transmission (e.g., a high-band downlink transmission) of the first RAT may be received at a frequency that is in a different frequency band than a frequency of the supplemental uplink transmission.

High-band transmission manager 850 may manage one or more high-band connections. In some cases, the downlink transmission of the first RAT may not be used to determine the first uplink transmission power for the supplemental uplink transmission.

Random access manager 855 may perform random access procedure for a connection. In some cases, the first uplink transmission is a random access channel (RACH) transmission and the received power of the downlink transmission of the second RAT is used for open loop power control and ramping of a random access procedure.

Configuration manager 860 may receive configuration information linking the downlink transmission of the second RAT to the first uplink transmission of the first RAT, receive configuration information linking the uplink timing for the first uplink transmission of the first RAT to the reference timing of the second RAT. In some cases, the configuration information is received in RRC signaling from a base station of the first RAT.

Figure 9:
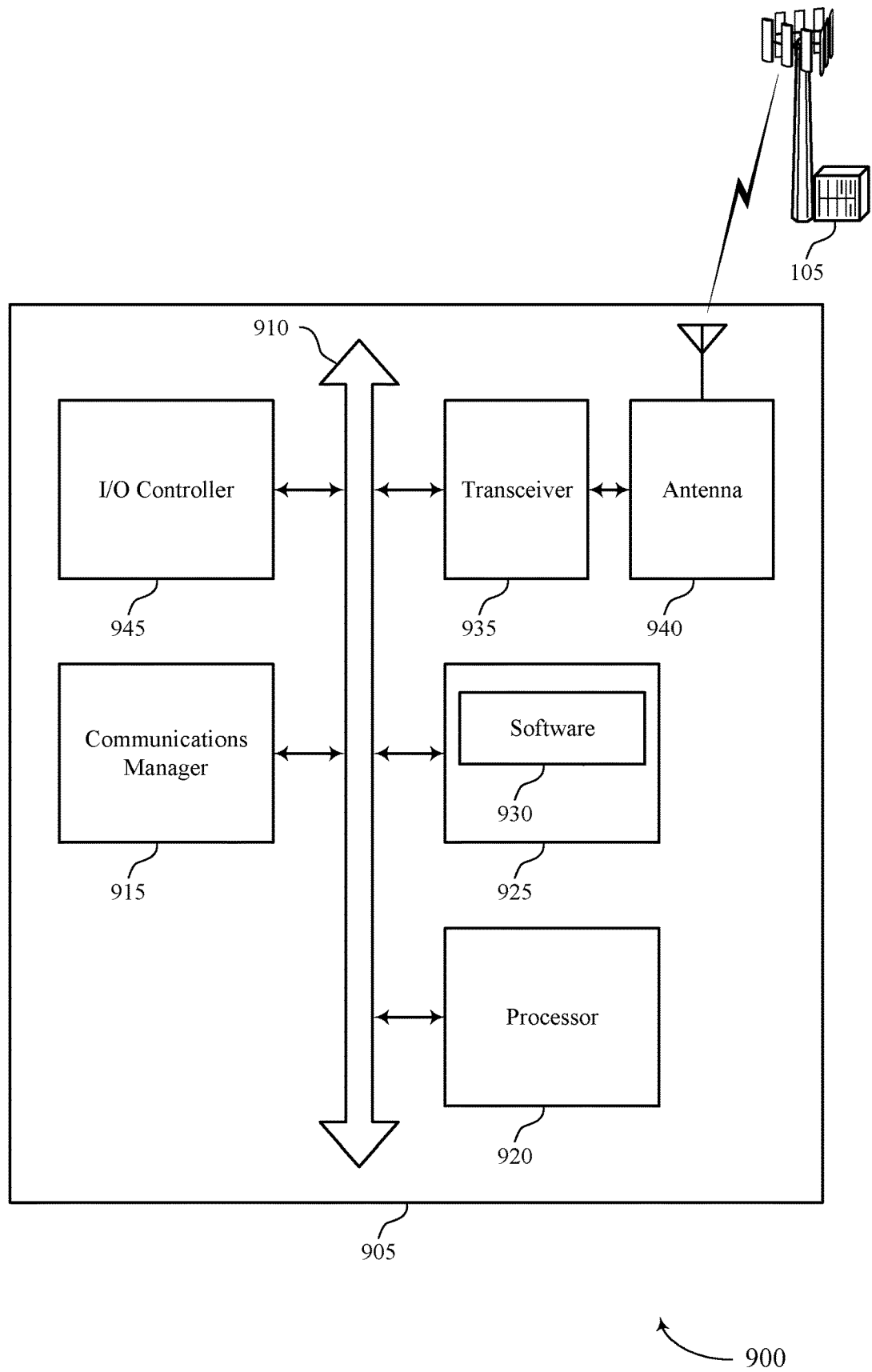
FIG. 9 illustrates a block diagram of a system including a device that supports mobility and power control techniques across multiple radio access technologies in accordance with aspects of the present disclosure.

FIG. 9 shows a diagram of a system 900 including a device 905 that supports mobility and power control techniques across multiple radio access technologies in accordance with aspects of the present disclosure. Device 905 may be an example of or include the components of wireless device 605, wireless device 705, or a UE 115 as described above, for example, with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting mobility and power control techniques across multiple radio access technologies).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support mobility and power control techniques across multiple radio access technologies. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
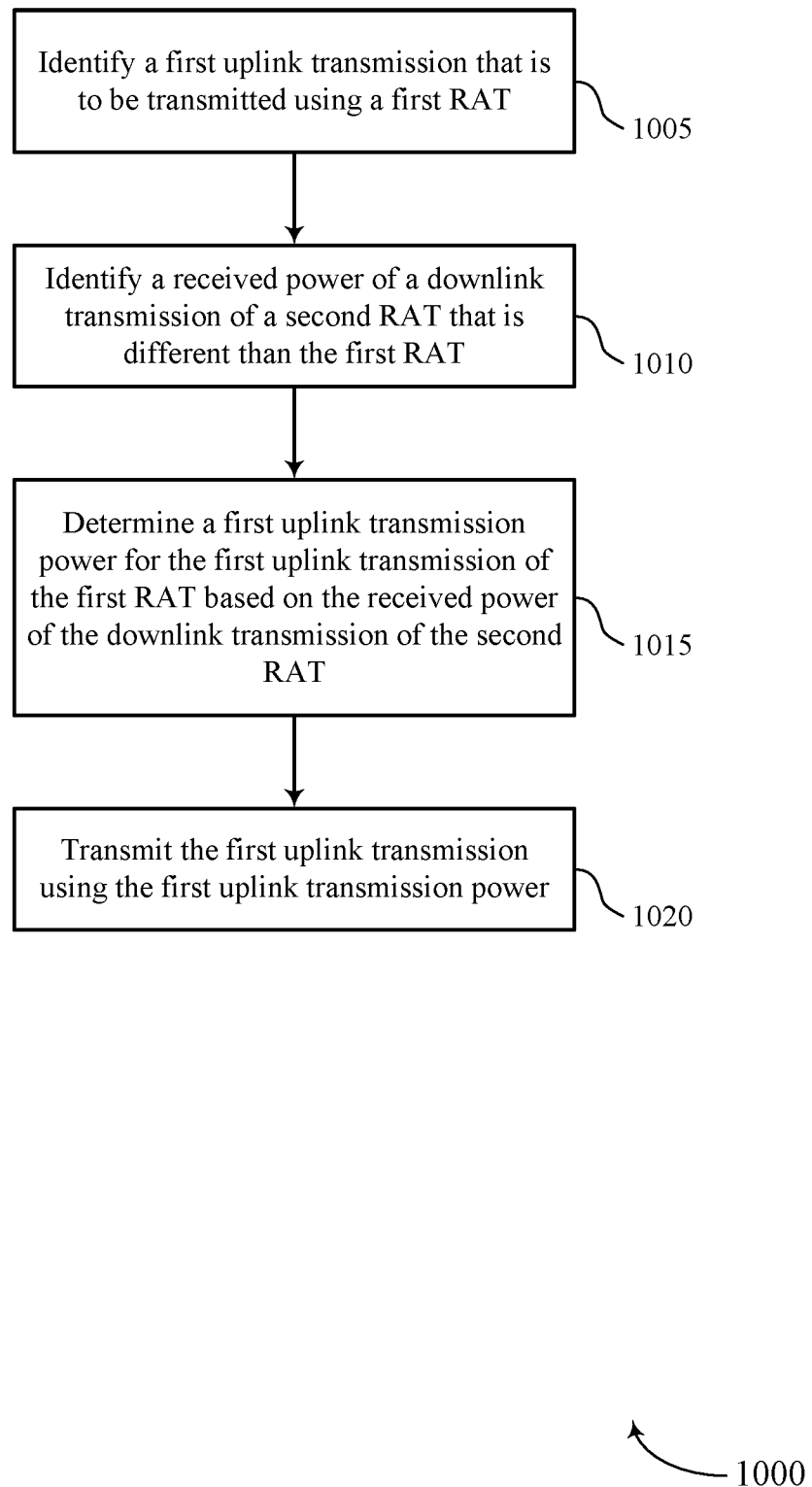
FIGS. 10 through 13 show flowcharts illustrating methods for mobility and power control techniques across multiple radio access technologies in accordance with aspects of the present disclosure.

FIG. 10 shows a flowchart illustrating a method 1000 for mobility and power control techniques across multiple radio access technologies in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may identify a first uplink transmission that is to be transmitted using a first RAT. The operations of block 1005 may be performed according to the methods described herein. In certain examples, aspects of the operations of block 1005 may be performed by a first RAT transmission manager as described with reference to FIGS. 6 through 9.

At block 1010 the UE 115 may identify a received power of a downlink transmission of a second RAT that is different than the first RAT. The operations of block 1010 may be performed according to the methods described herein. In certain examples, aspects of the operations of block 1010 may be performed by a measuring component as described with reference to FIGS. 6 through 9.

At block 1015 the UE 115 may determine a first uplink transmission power for the first uplink transmission of the first RAT based at least in part on the received power of the downlink transmission of the second RAT. The operations of block 1015 may be performed according to the methods described herein. In certain examples, aspects of the operations of block 1015 may be performed by a power determination component as described with reference to FIGS. 6 through 9.

At block 1020 the UE 115 may transmit the first uplink transmission using the first uplink transmission power. The operations of block 1020 may be performed according to the methods described herein. In certain examples, aspects of the operations of block 1020 may be performed by a first RAT transmission manager as described with reference to FIGS. 6 through 9.

Figure 11:
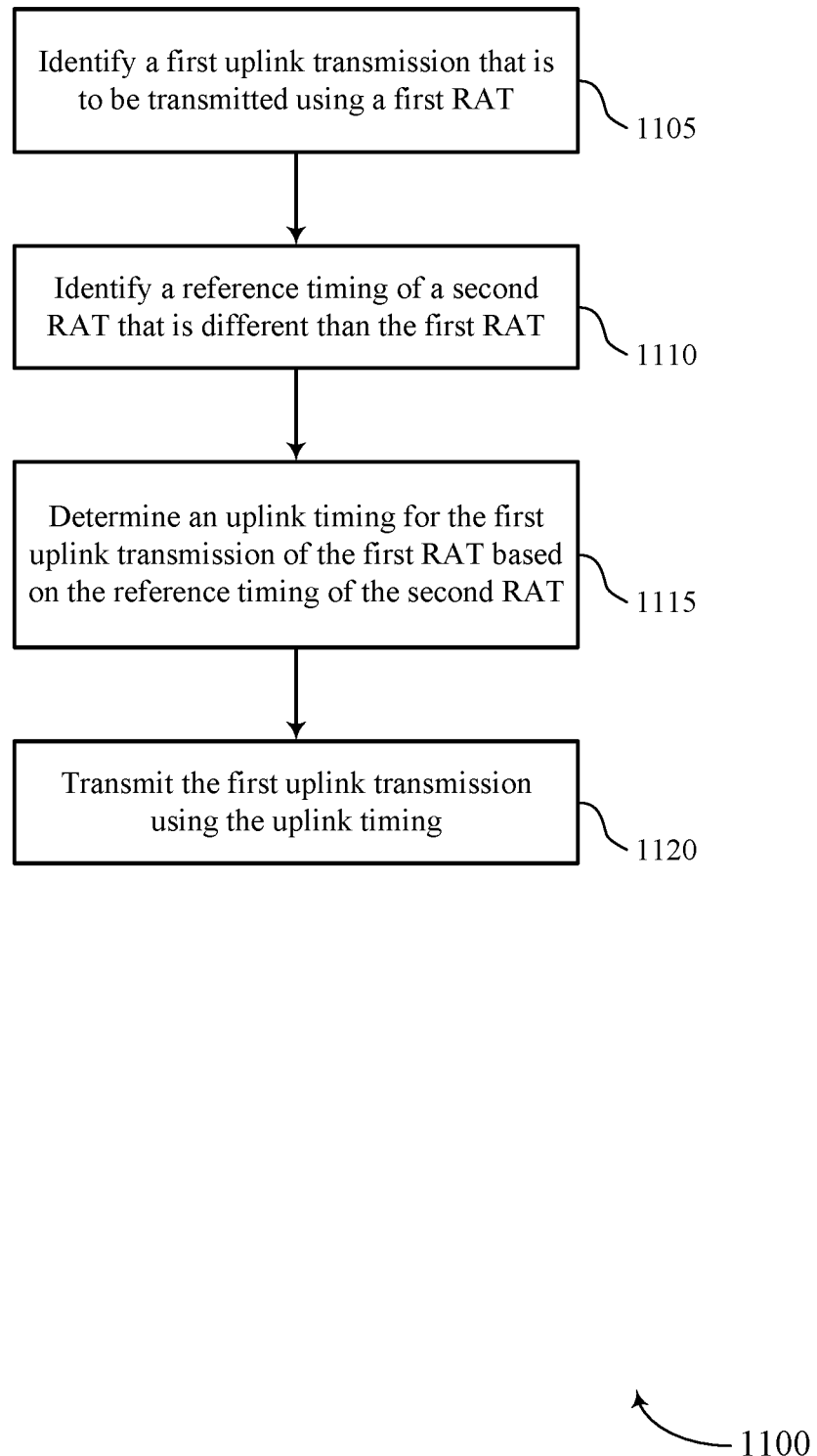

FIG. 11 shows a flowchart illustrating a method 1100 for mobility and power control techniques across multiple radio access technologies in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify a first uplink transmission that is to be transmitted using a first RAT. The operations of block 1105 may be performed according to the methods described herein. In certain examples, aspects of the operations of block 1105 may be performed by a first RAT transmission manager as described with reference to FIGS. 6 through 9.

At block 1110 the UE 115 may identify a reference timing of a second RAT that is different than the first RAT. The operations of block 1110 may be performed according to the methods described herein. In certain examples, aspects of the operations of block 1110 may be performed by a timing manager as described with reference to FIGS. 6 through 9.

At block 1115 the UE 115 may determine an uplink timing for the first uplink transmission of the first RAT based at least in part on the reference timing of the second RAT. The operations of block 1115 may be performed according to the methods described herein. In certain examples, aspects of the operations of block 1115 may be performed by a timing manager as described with reference to FIGS. 6 through 9.

At block 1120 the UE 115 may transmit the first uplink transmission using the uplink timing. The operations of block 1120 may be performed according to the methods described herein. In certain examples, aspects of the operations of block 1120 may be performed by a first RAT transmission manager as described with reference to FIGS. 6 through 9.

Figure 12:
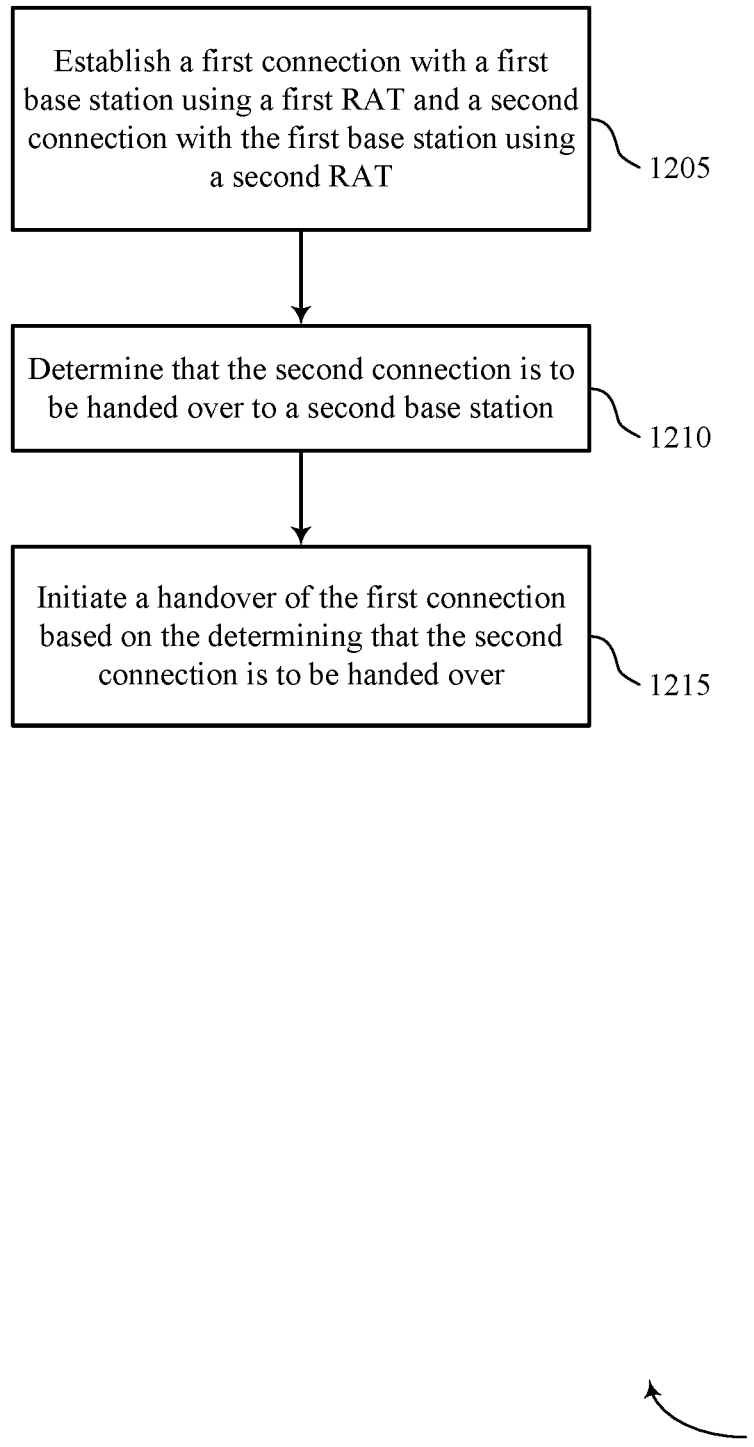

FIG. 12 shows a flowchart illustrating a method 1200 for mobility and power control techniques across multiple radio access technologies in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may establish a first connection with a first base station using a first RAT and a second connection with the first base station using a second RAT. The operations of block 1205 may be performed according to the methods described herein. In certain examples, aspects of the operations of block 1205 may be performed by a first RAT transmission manager as described with reference to FIGS. 6 through 9.

At block 1210 the UE 115 may determine that the second connection is to be handed over to a second base station. The operations of block 1210 may be performed according to the methods described herein. In certain examples, aspects of the operations of block 1210 may be performed by a handover manager as described with reference to FIGS. 6 through 9.

At block 1215 the UE 115 may initiate a handover of the first connection based at least in part on the determining that the second connection is to be handed over. The operations of block 1215 may be performed according to the methods described herein. In certain examples, aspects of the operations of block 1215 may be performed by a handover manager as described with reference to FIGS. 6 through 9.

Figure 13:
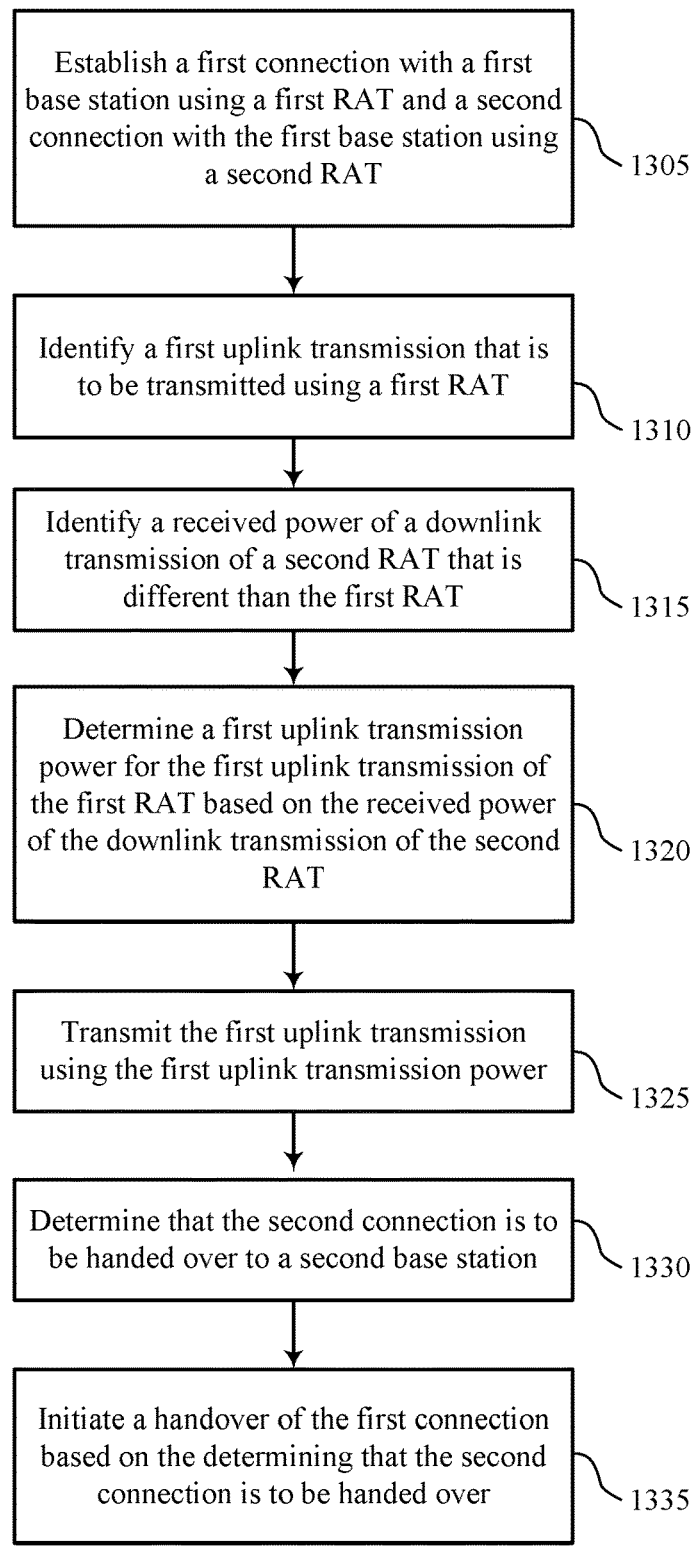

FIG. 13 shows a flowchart illustrating a method 1300 for mobility and power control techniques across multiple radio access technologies in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may establish a first connection with a first base station using a first RAT and a second connection with the first base station using a second RAT. The operations of block 1305 may be performed according to the methods described herein. In certain examples, aspects of the operations of block 1305 may be performed by a first RAT transmission manager as described with reference to FIGS. 6 through 9.

At block 1310 the UE 115 may identify a first uplink transmission that is to be transmitted using a first RAT. The operations of block 1310 may be performed according to the methods described herein. In certain examples, aspects of the operations of block 1310 may be performed by a first RAT transmission manager as described with reference to FIGS. 6 through 9.

At block 1315 the UE 115 may identify a received power of a downlink transmission of a second RAT that is different than the first RAT. The operations of block 1315 may be performed according to the methods described herein. In certain examples, aspects of the operations of block 1315 may be performed by a measuring component as described with reference to FIGS. 6 through 9.

At block 1320 he UE 115 may determine a first uplink transmission power for the first uplink transmission of the first RAT based at least in part on the received power of the downlink transmission of the second RAT. The operations of block 1320 may be performed according to the methods described herein. In certain examples, aspects of the operations of block 1320 may be performed by a power determination component as described with reference to FIGS. 6 through 9.

At block 1325 the UE 115 may transmit the first uplink transmission using the first uplink transmission power. The operations of block 1325 may be performed according to the methods described herein. In certain examples, aspects of the operations of block 1325 may be performed by a first RAT transmission manager as described with reference to FIGS. 6 through 9.

At block 1330 the UE 115 may determine that the second connection is to be handed over to a second base station. The operations of block 1330 may be performed according to the methods described herein. In certain examples, aspects of the operations of block 1330 may be performed by a handover manager as described with reference to FIGS. 6 through 9.

At block 1330 the UE 115 may initiate a handover of the first connection based at least in part on the determining that the second connection is to be handed over. The operations of block 1330 may be performed according to the methods described herein. In certain examples, aspects of the operations of block 1330 may be performed by a handover manager as described with reference to FIGS. 6 through 9.

In some examples, aspects from two or more of the described methods may be combined. It should be noted that the described methods are just example implementations, and that the operations of the described methods may be rearranged or otherwise modified such that other implementations are possible.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency division multiple access (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
communicating one or more data transmissions using a first radio access technology (RAT) in a first frequency band;
identifying a first uplink transmission that is to be transmitted using the first RAT in a second frequency band that is different than the first frequency band;
identifying a received power of a downlink transmission of a second RAT that is different than the first RAT, wherein the downlink transmission of the second RAT is received in a different frequency band than the second frequency band for transmitting the first uplink transmission;
determining a first uplink transmission power for transmitting the first uplink transmission of the first RAT in the second frequency band based at least in part on the received power of the downlink transmission of the second RAT; and
transmitting the first uplink transmission in the second frequency band using the first uplink transmission power.

2. The method of claim 1, wherein:
the identifying the received power of the downlink transmission of the second RAT further comprises identifying the downlink transmission of the second RAT, measuring the received power of the downlink transmission of the second RAT, and determining a pathloss associated with the downlink transmission of the second RAT based at least in part on the measured received power.

3. The method of claim 2, wherein:
the determining the first uplink transmission power for transmitting the first uplink transmission of the first RAT further comprises using the pathloss associated with the downlink transmission of the second RAT as a reference serving cell pathloss in an uplink power calculation for the first uplink transmission of the first RAT.

4. The method of claim 1, wherein:
a transmitter of the downlink transmission of the second RAT is colocated with a receiver of the first uplink transmission.

5. The method of claim 1, wherein:
the first uplink transmission is a supplemental uplink transmission of the first RAT, and wherein the communicating the one or more data transmissions further comprises receiving a downlink transmission of the first RAT transmitted in the first frequency band.

6. The method of claim 5, wherein:
the downlink transmission of the first RAT is not used to determine the first uplink transmission power for transmitting the supplemental uplink transmission.

7. The method of claim 5, wherein:
the downlink transmission of the second RAT is communicated using a frequency that is within a same frequency band as a frequency that the downlink transmission of the first RAT was received in the first frequency band supplemental uplink transmission.

8. The method of claim 1, wherein:
the first uplink transmission is a random access channel (RACH) transmission and the received power of the downlink transmission of the second RAT is used for open loop power control and ramping of a random access procedure.

9. The method of claim 1, further comprising:
receiving configuration information linking the downlink transmission of the second RAT to the first uplink transmission of the first RAT.

10. The method of claim 9, wherein:
the configuration information is received in radio resource control (RRC) signaling from a base station of the first RAT.

11. The method of claim 1, wherein:
the first RAT is a New Radio (NR) or 5G RAT, and the second RAT is a Long Term Evolution (LTE) or 4G RAT.

12. The method of claim 1, further comprising:
establishing a first connection with a first base station using the first RAT and a second connection with the first base station using the second RAT;
determining that the second connection is to be handed over to a second base station; and
initiating a handover of the first connection based at least in part on the determining that the second connection is to be handed over.

13. The method of claim 12, wherein:
the second connection with the first base station using the second RAT is an anchor carrier connection and the first connection with the first base station is a supplemental uplink connection using the first RAT.

14. The method of claim 13, further comprising:
establishing a third connection, using the first RAT, with the first base station or a different base station.

15. The method of claim 14, wherein:
the handover of the first connection is performed independently of a second handover of the third connection.

16. The method of claim 12, wherein:
the first base station includes a first serving cell for the first RAT that is collocated with a second serving cell for the second RAT.

17. The method of claim 12, further comprising:
receiving configuration information linking the handover of the first connection to the handover of the second connection.

18. The method of claim 17, wherein:
the configuration information is received in radio resource control (RRC) signaling from the first base station.

19. A method for wireless communication, comprising:
  identifying a first uplink transmission that is to be transmitted using a first radio access technology (RAT);
  receiving one or more downlink transmissions using a second RAT that is different than the first RAT;
  identifying,
    based at least in part on the one or more downlink transmissions of the second RAT, a reference timing of the second RAT;
  determining
    an uplink timing for the first uplink transmission of the first RAT based at least in part on the reference timing of the second RAT; and
  transmitting the first uplink transmission using the first RAT according to the uplink timing.

20. The method of claim 19, wherein
  the determining the uplink timing further comprises identifying a timing advance group (TAG) of the first RAT having a timing advance (TA) that is based at least in part on the reference timing of the second RAT.

21. The method of claim 19, wherein
  a transmitter of the one or more downlink transmissions of the second RAT is colocated with a receiver for the first uplink transmission.

22. The method of claim 19, wherein
  the first uplink transmission is a supplemental uplink transmission of the first RAT, and wherein the method further comprises receiving a downlink transmission of the first RAT transmitted using a frequency that is in a different frequency band than a frequency of the supplemental uplink transmission.

23. The method of claim 22, wherein:
  the downlink transmission of the first RAT is not used to determine the uplink timing for the supplemental uplink transmission.

24. The method of claim 19, further comprising:
  receiving configuration information linking the uplink timing for the first uplink transmission of the first RAT to the reference timing of the second RAT.

25. The method of claim 24, wherein:
  the configuration information is received in radio resource control (RRC) signaling from a base station of the first RAT.

26. The method of claim 19, wherein
  the first RAT is a New Radio (NR) or 5G RAT, and the second RAT is a Long Term Evolution (LTE) or 4G RAT.

27. An apparatus for wireless communication, comprising:
  a processor;
  memory coupled with the processor; and
  instructions stored in the memory and operable, when executed by the processor, to cause the apparatus to:
    communicate one or more data transmissions using a first radio access technology (RAT) in a first frequency band;
    identify a first uplink transmission that is to be transmitted using the first RAT in a second frequency band that is different than the first frequency band;
    identify a received power of a downlink transmission of a second RAT that is different than the first RAT, wherein the downlink transmission of the second RAT is received in a different frequency band than the second frequency band for transmitting the first uplink transmission;
    determine a first uplink transmission power for transmitting the first uplink transmission of the first RAT in the second frequency band based at least in part on the received power of the downlink transmission of the second RAT; and
    transmit the first uplink transmission in the second frequency band using the first uplink transmission power.

28. The apparatus of claim 27, wherein the instructions to identify the received power of the downlink transmission of the second RAT are executable by the processor to cause the apparatus to:
  identify the downlink transmission of the second RAT;
  measure the received power of the downlink transmission of the second RAT; and
  determine a pathloss associated with the downlink transmission of the second RAT based at least in part on the measured received power.

29. The apparatus of claim 27, wherein the instructions to determine the first uplink transmission power for transmitting the first uplink transmission of the first RAT are executable by the processor to cause the apparatus to:
  use the pathloss associated with the downlink transmission of the second RAT as a reference serving cell pathloss in an uplink power calculation for the first uplink transmission of the first RAT.

30. An apparatus for wireless communication, comprising:
  a processor;
  memory coupled with the processor; and
  instructions stored in the memory and operable, when executed by the processor, to cause the apparatus to:
    identify a first uplink transmission that is to be transmitted using a first radio access technology (RAT);
    receive one or more downlink transmissions using a second RAT that is different than the first RAT;
    identify,
      based at least in part on the one or more downlink transmissions of the second RAT, a reference timing of the second RAT;
    determine
      an uplink timing for the first uplink transmission of the first RAT based at least in part on the reference timing of the second RAT; and
    transmit the first uplink transmission using the first RAT according to the uplink timing.

* * * * *